US005710578A

United States Patent [19]
Beauregard et al.

[11] Patent Number: 5,710,578
[45] Date of Patent: *Jan. 20, 1998

[54] COMPUTER PROGRAM PRODUCT FOR UTILIZING FAST POLYGON FILL ROUTINES IN A GRAPHICS DISPLAY SYSTEM

[75] Inventors: Gary Michael Beauregard; Larry Keith Loucks; Khoa Dang Nguyen; Robert John Urquhart, all of Austin, Tex.

[73] Assignee: International Business Machines Corporation, Armonk, N.Y.

[*] Notice: The term of this patent shall not extend beyond the expiration date of Pat. No. 4,962,468.

[21] Appl. No.: 521,858

[22] Filed: May 9, 1990

Related U.S. Application Data

[63] Continuation of Ser. No. 130,851, Dec. 9, 1987, Pat. No. 4,962,468.

[51] Int. Cl.$^6$ ................................................... G06T 11/40
[52] U.S. Cl. ................................................. 345/429; 345/443
[58] Field of Search ........................................... 364/518, 521, 364/522; 340/723, 747, 728; 395/119–129, 140–143

[56] References Cited

U.S. PATENT DOCUMENTS

| | | | |
|---|---|---|---|
| 4,481,594 | 11/1984 | Staggs et al. | 364/521 |
| 4,646,262 | 2/1987 | Smith | 364/900 |
| 4,667,306 | 5/1987 | Smith | 395/143 X |
| 4,677,573 | 6/1987 | Brown et al. | 364/521 |
| 4,805,116 | 2/1989 | Liang et al. | 395/129 |
| 4,808,986 | 2/1989 | Mansfield et al. | 340/747 |
| 4,914,729 | 4/1990 | Omori et al. | 395/118 |

OTHER PUBLICATIONS

Liang, B.C.C.; Method to Determine the Convexity of Polygons, IBM TDB vol. 28, No. 5, Oct., 1985, pp. 2203–2208.

J. Simons & J. Gonzalez; Polygon Filling in Graphics Display System, IBM TDB vol. 24, No. 1A, Jun. 1981, pp. 235–236.

S. Boinodiris; Flag–Mapped Area Fill Algorithm; IBM TDB, vol. 29, No. 4, Sep., 1986, pp. 1441–1446.

Shinde, Yogesh N.; Mudur, S. P.; Algorithms for Handling the Fill Area Primitive of GKS; Computer Graphics Forum 5 (1986), pp. 105–117.

Chlamtac, Merav; Harary, Itzchak; The Shift X Parity Watch Algorithm for Raster Scan Displays; IEEE Transactions of Computers, vol. C–34, No. 7, Jul., 1985, pp. 666–673.

Foley, J. D.; Van Dam, A.; Fundamentals of Interactive Computer Grpahics; Addison–Wesley, 1982; pp. 456–460.

(List continued on next page.)

Primary Examiner—Anton W. Fetting
Attorney, Agent, or Firm—Marilyn Smith Dawkins

[57] ABSTRACT

Two polygon fill algorithms are presented for filling polygons on a graphics display. The first polygon fill algorithm fills polygons that are strictly convex. The second polygon fill algorithm fills a larger class of polygons than the first polygon fill algorithm which includes polygons being concave in the x direction, and polygons having crossing lines. The first polygon fill algorithm tests the polygon for strict convexity by testing for a consistent turning direction, and by testing for once around in the y direction. The first polygon fill algorithm then stores the maximum and minimum value of the pel selected by the Bresenham algorithm for each scan line of the polygon. The fill line is drawn from the pel having the minimum value to the pel having the maximum value for each scan line of the polygon. The second polygon fill algorithm tests the polygon to ensure that it can be filled with one unique fill line for each scan line of the polygon. The second polygon fill algorithm stores both a minimum value and maximum value for each scan line of the polygon for each line of the polygon. A fill line is then drawn from the least minimum value to the greatest maximum value for each scan line of the polygon.

10 Claims, 38 Drawing Sheets

```
4049    }
4050
4051    shape = atoi(argv[1]);
4252    iter = atoi(argv[2]);
4053
4054    /* below code will be in GSL init one time */
4055    for(j = 0; j < 2048; j + = 2) { /* init the y elements */
4056        ys[j] = j >> 1;
4057        ys[j + 1] = j >> 1;
4058    }
4059
4060    if ((shape > = 4) && (shape < = 7)) { /* read in the poly */
4061        inlines = atoi(argv[3]);
4062        ymin = 4000;
4063        ymax = 0;
4064
4065        for (i = 0; i < inlines; i + +) {
4066            inx[i] = atoi(argv[4 + 2*i]);
4067            iny[i] = atoi(argv[5 + 2*i]);
4068            if(iny[i] > ymax)  ymax = iny[i];
4069            if(iny[i] < ymin)  ymin = iny[i];
4070        }
4071        printf("\n ymin = %d ymax = %d\n", ymin, ymax);
4072        /* my own copy of the points so I'll add 2 points for gsfl.c */
```

© COPYRIGHT IBM CORP 1987

OTHER PUBLICATIONS

W. D. Little & R. Heuft; An Area Shading Graphics Display System, IEEE Transactions on Computers, vol. C–28, No. 7, Jul., 1979, pp. 528–531.

S. A. Dudani; Region Extraction Using Boudary Following, Pattern Recognition and Artificial Intelligence, Academic Press, 1976, pp. 216–232.

B. D. Ackland; The Edge Flag Algorithm–Fill Method for Raster Scan Displays, IEEE Transactions on Computers, Jan., 1981, pp. 41–47.

J. H. Potts, et al; The Decompostion of an Arbitrary Three–Dimensional Planar Polygon into a Set of Convex Polygons, Naval Postgraduate School Feb., 1987, pp. 1–76.

B. Kelleher, "MIPOLYCON", Digital Equipment Corporation and the Massachusetts Institute of Technology, Copyright 1987, 5 pages.

FIG. 4A

```
       ffpf 1
4001   #include <stdio.h>     }_ 40
4002   #include <math.h>
4003
4004   main(argc,argv)
4005      int argc;
4006      char *argv [ ];
4007   {
4008      extern void genline ( );
4009      int xs[2048], xs2[2048], ys[2048];
4010      int inx[100], iny[100], inlines;
4011      int x1, x2, y1, y2;
4012      int ymin, ymax, total;
4013      int i, j, k, rc;
4014      int iter;
4015      int shape;
4016      int buffer[400], size, savrst, grant, retract, m_one, zero;
4017      int white, red, blue, style, lop;
4018   #ifdef GSL
4019      /* initialize the screen for GSL */
4020      white = 15;
4021      red = 3;
4022      blue = 4;
4023      style = -1;
4024
```

© COPYRIGHT IBM CORP 1987

FIG. 4B

```
4025      size = 1024;
4026      zero = 0;
4027      m_one = -1;
4028      savrst = 0;       /* non-zero = > new screen    */
4029      grant = 0;
4030      retract = 0;
4031
4032      rc=gsinit_(buffer, &size, &savrst, &grant, &retract, &m_one);
4033      printf("init rc = %d\n", rc);
4034  #endif
4035
4036      if(argc < 3) {    /*one more than no of args */
4037        printf("usage: <shape>, <iterations>, input-poly \n");
4038        printf("       (1) shape:   0 = bypass brez (draw rectangle) \n");
4039        printf("                    1 = parallelogram \n");
4040        printf("                    2 = quadralateral \n");
4041        printf("                    3 = 380 x 19 parallelogram \n");
4042        printf("                    4 = input your own(call genline directly) \n");
4043        printf("                    5 = input your own(call gsff/genline1) \n");
4044        printf("                    6 = input your own(call gsff2/genline2 \n");
4045        printf("       (2) no of iterations                       \n");
4046        printf("       (3) num: no. of lines (closed poly) (ccw please) \n");
4047        printf("       (4)-(4+2(num) - pts:   x1,  y1,  x2 ... \n");
4048      exit(-1);
```

FIG. 4C

```
4049        }
4050    }
4051    shape = atoi(argv[1]);
4252    iter = atoi(argv[2]);
4053
4054    /* below code will be in GSL init one time  */
4055    for(j = 0; j < 2048; j + = 2)  { /* init the y elements  */
4056        ys[j] = j >> 1;
4057        ys[j + 1] = j >> 1;
4058    }
4059
4060    if ((shape > = 4) && (shape < = 7)) { /* read in the poly */
4061        inlines = atoi(argv[3]);
4062        ymin = 4000;
4063        ymax = 0;
4064
4065        for (i = 0; i < inlines; i + +) {
4066            inx[i] = atoi(argv[4 + 2*i]);
4067            iny[i] = atoi(argv[5 + 2*i]);
4068            if(iny[i] > ymax)  ymax = iny[i];
4069            if(iny[i] < ymin)  ymin = iny[i];
4070        }
4071        printf("\n ymin = %d ymax = %d\n", ymin, ymax);
4072        /*my own copy of the points so I'll add 2 points for gsff.c */
```

© COPYRIGHT IBM CORP 1987

```
4073        inx[inlines ] = inx[0];
4074        iny[inlines ] = iny[0];
4075        inx[inlines +1] = inx[1];
4076        iny[inlines +1] = iny[1];
4077     }
4078
4079     for (i = 0; i < iter; i ++) {
4080
4081       switch(shape ) {
4082       case 0:  /* bypassing brezinham */
4083         for(j = 2 * 400; j < = 2 * 418; j + = 2){
4084            xs [ j ] = 400;
4085            xs [ j +1 ] = 418;
4086         }
4087         ymin = 400;
4088         ymax = 418;
4089         break;
4090
4091        case 1:   /* parallelogram*/
4092         ymax = 418;
4093         ymin  = 400;
4094         genline(&xs[0], 400, 400, 418, 400 );
4095         genline(&xs[0], 418, 400, 436, 418 );
4096         genline(&xs[0], 436, 418, 418, 418 );
4097         genline(&xs[0], 418, 418, 400, 400 );
4098         break;
4099
4100        case 2:   /* quadralateral */
4101         ymax = 427;
4102         ymin  = 400;
4103         genline(&xs[0], 400, 400, 414, 413 );
4104         genline(&xs[0], 414, 413, 400, 427 );
4105         genline(&xs[0], 400, 427, 387, 414 );
4106         genline(&xs[0], 387, 414, 400, 400 );
4107         break;
4108
```

© COPYRIGHT IBM CORP 1987

*FIG. 4D*

```
4109        case 3:   /* larger parallelogram   */
4110        ymax = 480;
4111        ymin = 100;
4112        genline(&xs[0], 100, 100, 118, 100 );
4113        genline(&xs[0], 118, 100, 496, 480 );
4114        genline(&xs[0], 496, 480, 480, 480 );
4115        genline(&xs[0], 480, 480, 100, 100 );
4116        break;
4117
4118         case 4:   /* inputted poly  */
4119         for (j = 0;  j < inlines;  j++ ) {
4120            x1 = inx[ j ];
4121            y1 = iny[ j ];
4122            x2 = inx[ j + 1];
4123            y2 = iny[ j + 1];
4124            genline(&xs[0], x1, y1, x2, y2 );
4125            if(y1 > y2 ) {
4126               if(y1 > ymax ) ymax = y1;
4127               if(y2 < ymax ) ymin = y2;
4128            }
4129            else {
4130               if(y2 > ymax ) ymax = y2;
4131               if(y1 < ymax ) ymin = y1;
4132            }
4133         }
4134         break;
4135
```

© COPYRIGHT IBM CORP 1987

*FIG. 4E*

```
4136              case 5: /* inputted poly - call GSL function(gsff)  */
4137  50 ─── gsff(inlines, &inx[0], &iny[0], &xs[0], &ys[0]);
4138              break;
4139
4140              case 6: /* inputted poly - call GSL function(gsff2) */
4141  70 ─── gsff2(inlines, &inx[0], &iny[0], &xs[0], &xs2[0], &ys[0]);
4142              break;
4143
4144              case 7: /* inputted poly - call GSL function (gsff)  */
4145              i = iter; /* only one pass */
4146              gsff2(inlines, &inx[0], &iny[0], &xs[0], &xs2[0], &ys[0]);
4147              for ( j = ymin; j <= ymax; j++ ) {
4148                  xs2[2 * j]     = xs[2 * j];
4149                  xs2[2 * j + 1] = xs[2 * j + 1];
4150              }
4151              gsff(inlines, &inx[0], &iny[0], &xs[0], &ys[0]);
4152              printf(" \n ymin = %d ymax = %d \n", ymin, ymax );
4153              for(j = ymin; j <= ymax; j++) {
4154                  if((x2 = xs2[2 * j])!= (x1= xs[2 * j])) {
4155                      printf(" Min diff: y=%d (g1 =%d, g2 =%d) \n", j, x1, x2 ;)
4156                  }
4157                  if((x2 = xs2[2 * j + 1])!= (x)= xs[2 * j + 1])) {
4158                      printf(" Max diff: y=%d (g1 =%d, g2 =%d) \n", j, x1, x2 ;)
4159                  }
4160              }
```

/* copy gen2 into xs2 */

© COPYRIGHT IBM CORP 1987

```
4161              break;
4162           } /*end select*/
4163
4164    #ifdef GSL
4165           if((shape_ != 5) && (shape_ != 6))){
4166              total = 2 * (ymax - ymin + 1);
4167              rc = gsmult_( &total, &xs[2 * ymin], &ys[2 * ymin]);
4168           }
4169
4170    #endif
4171        } /* end of for i = iterations */
4172
4173    #ifdef GSL
4174           /* Test support to determine if gsl and ffpf are equal */
4175           if(shape >= 4) {
4176              sleep(5);
4177              /*
4178              gsfatt_ (&red, &style);
4179              */
4180              lop = 6;  /* exclusive or */
4181              gslop_(&lop);
4182              if(iter == 11){
4183
4184
```

© COPYRIGHT IBM CORP 1987

```
4185        for(j = 0; j < inlines; j + +) {
4186            inx [ j ] + = 5;
4187            iny [ j ] + = 5;
4188        }
4189    }
4190    gsfply_( &inlines, inx, iny);
4191    scanf ("%d", &i);
4192    }
4193    gsterm_( );
4194    printf("   multi line rc %d \n", rc);
4195 #endif
4196
4197    if(iter == 1 ) {
4198        printf("\n ymin = %d ymax = %d \n", ymin, ymax);
4199        for ( i = ymin; i < = ymax; i + + ) {
4200            printf(" y = %d ( %d - %d) \n", i, xs[2 * i ], xs[2 * i + 1]);
4201        }
4202        printf("\n");
4203    }
```

FIG. 4H

© COPYRIGHT IBM CORP 1987

```
              50   151   152 153 154 155
5047           /    /     /   /   /   /
5048    gsff(inlines, inx, iny, xs, ys)
5049            int inlines;
5050            int inx[ ];
5051            int iny[ ];
5052            int xs[ ], ys[ ];
5053    {
5054            extern void genline( );
5055            extern void gsmult_( );
5056            extern void gsline_( );
5057            int x0, x1, x2, y0, y1, y2;
5058            int x, y, ymin, ymax, total;
5059            int * inxp;
5060            int * inyp;
5061            int i, j, k;
5062            int dx1m0, dx2m1, dy1m0, dy2m1;
5063            int dir, dir1, fail;
5064            int ylow, yhigh;
5065            /* around check */
5066            int cnt;   /* no of dy sign changes */
5067            int oldsign, newsign;  /* sign of dy.1 = plus */
5068
5069            fail = 0;              57
5070                                    /
5071            /* initial the turning test */
5072            inxp = inx;
5073            inyp = iny;
5074            dx1m0 = ( x1 = *( inxp + 1 )) - *(inxp) ;
5075            dx2m1 = *( inxp + 2 ) - x1;
5076            dy1m0 = (y1 = *(inyp + 1 )) - *( inyp );
5077            dy2m1 = *( inyp + 2 ) - y1;
5078            dir = dy1m0 * dx2m1 > dx1m0 * dy2m1;  /* cw */
5079                                             /58
5080            /* initialize the once_around test */
5081            cnt = 1;
5082            oldsign = dy1m0 > 0;   /* 1 = plus*/
5083
5084            /* initialize ymin, ymax */
5085            ylow = 0;
```

FIG. 5A

© COPYRIGHT IBM CORP 1987

```
5086        yhigh = 0;
5087        ymin = ymax =*( inyp ) ;   57
5088                                  /
5089        for(i = 1;  i < inlines; i++) {
5090          /* turning test */
5091          inxp + = 1;   /* &inx [ i ] */
5092          inyp + = 1;   /* &iny [ i ] */
5093          dx1m0 = dx2m1;
5094          dy1m0 = dy2m1;
5095          dx2m1 =*(inxp + 2)-*(inxp + 1) ;
5096          dy2m1 =*(inyp + 2)-*(inyp + 1) ;
5097          dir1 = dy1m0 * dx2m1 > dx1m0 * dy2m1,  /*>=>cw */
5098
5099          /* once-around test */  ~ 58
5100          newsign = dy1m0 > 0;   /* 1 = plus */
5101          cnt += newsign != oldsign;
5102          oldsign = newsign;
5103
5104          if ((dir != dir1) " ( cnt > = 4 )){
5105        fail = 1;
5106        break;    /*get out of for loop asap*/
5107          }
5108
5109          y =* inyp;
5110          if ( y  > ymax ) { ymax = y; yhigh = i; }
5111          else  if ( y < ymin ) { ymin = y; ylow = i; }
5112        }
5113
5114        total = 2 * ( ymax - ymin + 1 ) ;
5115
5116   #ifdef DB
5117        printf(" ymax = %d, ymin = %d \n", ymax, ymin ) ;
5118   #endif
5119          if(fail == 1 ) {
5120            if(dir ! = dir1)
5121          printf( "Convexity test failed \n" ) ;
5122            if(cnt > = 4)
5123          printf( "Around test failed \n" ) ;
```

FIG. 5B

© COPYRIGHT IBM CORP 1987

```
5124        return;
5125    }
5126    #ifdef DB
5127    else {
5128        printf("Convexity test succeeded \n");
5129        if(dir == 0 ){
5130        printf("   Polygon is Counterclockwise \n");
5131    }
5132    else printf("   Polygon is Clockwise\ n");
5133    }
5134    #endif 5135
5136    /* initialize &xs @ index of ymin & ymax */
5137    xs[2 * *(iny + ylow ) + 1 ] = *(inx + ylow );    /* init max @ ymin */
5138    xs[2 * *(iny + yhigh ) ]    = *(inx + ylow );    /* init min @ ymax */
5139
5140    if(dir == 0) {  /* ccw from index = ylow */
5141        for (i = 0; i < inlines; i++){
5142        if((j = i + ylow) >= inlines) j -= inlines;
5143    #ifdef NOGEN
5144        genline (&xs[0],*(inx+j),*(iny+j),*(inx+j+1),*(iny+j+1));
5145    #endif          60
5146    }
5147 }
```

FIG. 5C

© COPYRIGHT IBM CORP 1987

```
5148        else {
5149          for(i = 0; i < inlines; i++) {
5150            if((j = ylow - i) <= 0) j+ = inlines;
5151    #ifdef NOGEN
5152            genline (&xs[0], *(inx+j), *(iny+j), *(inx+j-1), *(iny+j-1));
                          ⌢         ⌢       ⌢        ⌢         ⌢
5153                     154        152     153      156       157
5154    #endif
5155          }
5156        }
5157    #ifdef DB
5158        for(i = ymin; i <= ymax; i++) {
5159          printf(" y = %d, (%d -- %d)\n", i, xs[2*i], xs[2*i + 1]);
5160        }
5161    #endif
5162
5163    #ifdef GSL
5164        gsmult_ (&total, &xs[2*ymin], &ys[2*ymin]);
5165    #endif
5166      }
5167    }
5168
```

FIG. 5D

© COPYRIGHT IBM CORP 1987

FIG. 6A

```
6038  genline(xs,  x1,  y1,  x2,  y2)
6039    ~        int xs[ ];
6040    60       int x1,  y1,  x2,  y2;
6041  {
6042         int dx, dy;
6043         int a, b, i;
6044         int b2, bma;
6045         int oct;
6046         int y, x;
6047         int * tab;
6048
6049         dx = x2 - x1;
6050         dy = y2 - y1;
6051
6052         x = x1;
6053         y = y1;
6054
6055         tab = &xs[ 2 * y ];   /* pointing at min table */
6056
6057  /*This logic 1) sets brezinham a & b values & 2 ) detects octant
6058   */
6059         if(y1 == y2 ) {    /* horizontal line */
6060            if (x2 > x1 ) {
6061               *(tab + 1) = x2;
6062
```

© COPYRIGHT IBM CORP 1987

```
6063              }
6064          else {
6065            *(tab ) = x2;
6066          }
6067          return;
6068        }

6070        if(y 2 > y 1 ) {        /* 1 2 3 4 */
6071          tab + = 1;        /* point @ max table */
6072          if ( x2 > = x1 ) {    /* 1 2 */
6073          if(dx > = dy ) {
6074            oct = 1;
6075            a = dx;
6076            b = dy;
6077          }
6078          else {
6079            oct = 2;
6080            a = dy;
6081            b = dx;
6082          }
6083          }
6084          else {            /* 3 4 */
6085          if ( - dx > = dy ) {
6086            oct = 4;
6087            a = - dx;
6088            b = dy;
6089          }
6090          else {
6091            oct = 3;
6092            a = dy;
6093            b = - dx;
6094          }
6095          }
6096        }
6097        else {            /* 5 6 7 8 */
6098          if(x2 > = x1 ) {    /* 7 8 */
6099          if(dx > = - dy) {
6100            oct = 8;
```

FIG. 6B

© COPYRIGHT IBM CORP 1987

```
6101                    a = dx;
6102                    b = -dy;
6103                }
6104             else {
6105                    oct = 7;
6106                    a = -dy;
6107                    b = dx;
6108                }
6109             }
6110             else {            /* 5 6 */
6111                if(-dx > = -dy ) {
6112                    oct = 5;
6113                    a = -dx;
6114                    b = -dy;
6115                }
6116                else {
6117                    oct = 6;
6118                    a = -dy;
6119                    b = -dx;
6120                }
6121             }
6122         } 170
6123          /
6124         bma = 2 * ( b - a );
6125        / b2 = 2 * b;
        171
```

© COPYRIGHT IBM CORP 1987

*FIG. 6C*

```
6126        i = ( 2 * b - a ) - ( x2 < x1 );   /* initial error term */
6127    }
6128 172  switch(oct) {
6129        case 1:         /*always a max-line(ccw) */
6130        for(x=x1 + 1;   x <= x 2;  x ++ ) {
6131           if( i < 0 ) {
6132              i = i + b2;
6133           }
6134           else {
6135              i = i + bma;
6136              *tab = x - 1;   /* last on previous */
6137              tab + = 2;
6138           }
6139        }
6140        *tab = x - 1;   /* because x is x2 + 1 after for loop. */
6141        break;
6142
6143        case 2:         /*always a max-line(ccw) */
6144        for(y = y1 + 1;   y <= y 2;  y ++ ) {
6145           if(i < 0 ) {
6146              i = i + b2;
6147           }
6148           else {
6149              i = i + bma;
6150              x ++;
```

*FIG. 6D*

© COPYRIGHT IBM CORP 1987

```
6151            }
6152            tab += 2;
6153            *tab = x;
6154        }
6155     break
6156
6157     case 3:      /* always a max-line(ccw) */
6158     for(y = y1 + 1; y <= y2; y ++) {
6159         if ( i < 0 ) {
6160             i = i + b2;
6161         }
6162         else {
6163             i = i + bma;
6164             x --;
6165         }
6166         tab += 2;
6167         *tab = x;
6168     }
6169     break;
6170
6171     case 4:      /* always a max-line(ccw) */
6172     for ( x = x1-1; x >= x2; x --) {
6173         if ( i < 0 ) {
6174             i = i + b2;
6175         }
6176         else {
6177             i = i + bma;
6178             tab += 2;
6179             *tab = x;   /* first on new line is a max */
6180         }
6181     }
6182     break;
6183
6184     case 5:      /* always a min-line(ccw) */
6185     for ( x = x1 - 1; x >= x2; x --) {
6186         if ( i < 0 ) {
6187             i = i + b2;
6188         }
6189         else {
```

FIG. 6E

© COPYRIGHT IBM CORP 1987

```
6190            i = i + bma;
6191           *tab = x + 1;   /* last on a scan-line */
6192            tab -= 2;
6193          }
6194        }
6195       *tab = x + 1;    /* tenative last */
6196       break;
6197
6198       case 6:     /* always a min-line(ccw) */
6199       for(y = y - 1; y >= y2; y --) {
6200           if(i < 0) {
6201               i = i + b2;
6202           }
6203           else {
6204               i = i + bma;
6205               x --;
6206           }
6207           tab -= 2;
6208          *tab = x;
6209        }
6210        break;
6211
6212       case 7:     /* always a max-line(ccw) */
6213       for(y = y - 1; y >= y2; y --) {
6214           if(i < 0) {
6215               i = i + b2;
6216           }
6217           else {
6218               i = i + bma;
6219               x ++;
6220           }
6221           tab -= 2;
6222          *tab = x;
6223        }
6224        break;
6225
6226       case 8:     /* always a min-line(ccw) */
6227       for(x = x + 1; x <= x2; x ++) {
6228           if (i < 0) {
```

FIG. 6F

© COPYRIGHT IBM CORP 1987

```
6229                    i = i + b2;
6230            }
6231         else {
6232            i = i + bma;
6233            tab -= 2;
6234            *tab = x;    /* first on scan-line is a min */
6235         }
6236       }
6237       break;
6238
6239    default:
6240    break;
6241  }   /* end of select */
6242 }   /* end of genline */
```

© COPYRIGHT IBM CORP 1987

FIG. 6G

```
            70
7036       /
7037    gsff2(inlines, inx, iny, xs, xs2, ys)
7038         int inlines;
7039         int inx[ ];
7040         int iny[ ];
7041         int xs[ ], xs2[ ], ys[ ];
7042   {
7043         extern void genline2( );
7044         extern void gsmult_( );
7045         int* tab;
7046         int y0, y1;
7047         int x, y, ymin, ymax, total;
7048         int i, j, k;
7049         int ylow, yhigh;
7050         /* around check */
7051         int cnt;    /* no of dy sign changes */
7052         int oldsign, newsign;   /* sign of dy. 1 = plus */
7053
7054         fail = 0;
7055
7056         /* init y - convexity test */
```

FIG. 7A

© COPYRIGHT IBM CORP 1987

FIG. 7B

```
7057    cnt = 1;
7058    oldsign = iny [0] > iny [inlines - 1];    /* 1 => ccw */
7059
7060    /* init ymin, ymax */
7061    ylow = 0;
7062    yhigh = 0;
7063    ymax = ymin = iny[0];
7064
7065    for(i = 1; i < inlines; i ++) {      /* y - convexity check */
7066        newsign = iny[i] > iny[i - 1];    /* 1 => ccw */
7067        if(newsign != oldsign) cnt += 1;
7068        oldsign = newsign;
7069        if(cnt > = 4) {
7070            break;    /* get out of for loop asap */
7071        }
7072
7073        if(iny [i] > ymax ) { yhigh = i;    ymax = iny[i]; }
7074        if(iny [i] < ymin ) { ylow  = i;    ymin = iny[i]; }
7075    }
7076
7077    total = 2 * (ymax - ymin + 1);
7078 #ifdef DB
7079    printf(" yhigh = %d, ylow = %d\n", yhigh, ylow );
7080
```

© COPYRIGHT IBM CORP 1987

FIG. 7C

```
7081            printf(" ymax = %d, ymin = %d\n", ymax, ymin);
7082    #endif
7083            if(cnt >= 4)
7084                printf("Around test failed\n");
7085                return(-1);
7086            }
7087        }
7088        /* init &xs & &xs2 @ index of ymin & ymax */
7089        xs [2 * ymin]       = inx[ ylow ];      /* init  xs1 min */
7090        xs [2 * ymin + 1]   = inx[ ylow ];      /* init  xs1 max */
7091        xs 2[2 * ymax ]     = inx[ yhigh ];     /* init  xs2 min */
7092        xs 2[2 * ymax + 1]  = inx[ yhigh ];     /* init  xs2 max */
7093
7094        tab = xs;
7095        for(i = 0; i < inlines; i++) {
7096            if((( j = i + ylow ) >= inlines ) j -= inlines;
7097            if(j == yhigh) tab = xs2;
7098    #ifndef NOGEN
7099            genline2(tab, inx[j], iny[j], inx[j + 1], iny[j + 1]);
7100    #endif
7101        }
7102    #ifndef NOGEN
7103        /* combine 2 tables into 1 */
7104        for( i = 2 * ymin; i <= 2 * ymax; i += 2) {
7105
```

© COPYRIGHT IBM CORP 1987

```
7106            if(xs2 [i] < xs [i])         xs [i]     = xs2 [i];        /* min */
7107            if(xs2 [i + 1] > xs [i + 1])  xs [i + 1] = xs2 [i + 1];    /* max */
7108        }
7109  #endif
7110
7111  #ifdef GSL
7112        gsmult_ (&total, &xs [2 * ymin], &ys [2 * ymin]);
7113  #endif
7114    }
7115    return (0);
7116  }
7117
7118
```

*FIG. 7D*  © COPYRIGHT IBM CORP 1987

```
8045  genline2(xs, x1,  y1, x2, y2)
8046      int xs[ ];
8047      int x1, y1, x2, y2;
8048  {
8049      int dx, dy;
8050      int a, b, i;
8051      int b2, bma;
8052      int oct;
8053      int y, x;
```

*FIG. 8A*  © COPYRIGHT IBM CORP 1987

```
8054            int * tab;
8055            int yy;
8056    
8057    #ifdef DB
8058            printf("  \n ******  @ input of genline:  \n");
8059            printf("                   (%3d, %3d) ==> (%3d, %3d) \n", x1, y1, x2, y2);
8060    #endif
8061    
8062            dx = x2 - x1;
8063            dy = y2 - y1;
8064    
8065            x = x1;
8066            y = y1;
8067            tab = &xs[2 * y];           /* set tab to initial y */
8068    
8069    /*
8070     /  This logic 1) sets brezinham a & b values, and 2) detects octant.
8071     */
8072            if(y1 == y2) {              /* horizontal line */
8073               if(x2 > x1) {            /* 1 */
8074                  *(tab + 1) = x2;      /* save max x */
8075               } else {                 /* 4 */
8076                  *tab = x2;            /* save min x */
8077               }
8078            return;
```

*FIG. 8B*

```
8079            }
8080            if(y2 > y1 ) {          /* 1 2 3 4 */
8081               if(x2 > = x1 ) {     /* 1 2 */
8082               if(dx > = dy ) {
8083                  oct = 1;
8084                  a = dx;
8085                  b = dy;
8086               } else {
8087                  oct = 2;
8088                  a = dy;
8089                  b = dx;
8090               }
8091            } else {                 /* 3 4 */
8092               if( -dx > = dy ) {
8093                  oct = 4;
8094                  a = -dx;
8095                  b = dy;
8096               } else {
8097                  oct = 3;
8098                  a = dy;
8099                  b = -dx;
8100               }
8101            }
8102         } else {                    /* 5 6 7 8 */
8103            if(x2 > = x1){           /* 7 8 */
8104               if(dx > = -dy ) {
8105                  oct = 8;
8106                  a = dx;
8107                  b = -dy;
8108               } else {
8109                  oct = 7;
8110                  a = -dy;
8111                  b = dx;
8112               }
8113            } else {                 /* 5 6 */
8114               if(-dx > = -dy ) {
8115                  oct = 5;
8116                  a = -dx;
8117                  b = -dy;
```

*FIG. 8C*

© COPYRIGHT IBM CORP 1987

FIG. 8D

```
8118        } else {
8119            oct = 6;
8120            a = -dy;
8121            b = -dx;
8122        }
8123    }
8124    }
8125
8126    bma = 2 * (b - a);
8127    b2 = 2 * b;
8128    i = (2 * b - a) - (x2 < x1);      /* initial error term */
8129
8130 #ifdef DB
8131    printf("@final oct switch: oct = %d\n", oct);
8132    printf("(%3d, %3d ==> (%3d, %3d)\n", x1, y1, x2, y2);
8133    printf("           x = %3d, y = %3d\n", x, y);
8134 #endif
8135
8136    switch(oct) {
8137    case 1:      /* always a max-line (ccw) */
8138        for(x = x + 1; x <= x2; x++) {
8139            if(i < 0) {
8140                i = i + b2;
8141            } else {
8142
```

© COPYRIGHT IBM CORP 1987

```
8143            i = i + bma;
8144            *(tab + 1) = x - 1;        /* save max x(x was inc'd ) */
8145            tab += 2;                  /* step to new y */
8146            *tab = x;                  /* save new y's min x */
8147          }
8148        }
8149        *(tab + 1) = x -1;             /* save max x */
8150        break;
8151
8152      case 2:   /*always a max-line(ccw) */
8153        for(y = y + 1; y <= y2; y ++){
8154          if(i < 0){
8155            i = i + b2;
8156          } else {
8157            i = i + bma;
8158            x++;
8159          }
8160          tab += 2;                     /* step to new y */
8161          *tab = x;                     /* save min x */
8162          *(tab + 1) = x;               /* save max x */
8163
8164  #ifdef DB
8165        printf("     In oct = %d\n", oct);
8166        printf("     x = %3d, y = %3d\n", x, y);
8167  #endif
```

FIG. 8E

© COPYRIGHT IBM CORP 1987

```
8169                }
8170            break;
8171
8172            case 3:    /* always a max-line(ccw) */
8173            for(y = y + 1; y < = y2; y++){
8174                if(i < 0 ){
8175                    i = i + b2;
8176                } else {
8177                    i = i + bma;
8178                    x--;
8179                }
8180                tab += 2;              /* step to new y   */
8181                *tab= x;               /* save min x      */
8182                *(tab +1 ) = x;        /* save max x      */
8183
8184    #ifdef DB
8185        printf("      In oct = %d \n",oct);
8186        printf("      x = %3d, y = %3d \n", x,y );
8187    #endif
8188
8189            }
8190            break;
8191
8192            case 4:    /* always a max-line(ccw) */
8193            for(x = x - 1; x > = x2; x--) {
8194                if(i < 0) {
8195                    i = i + b2;
8196                } else {
8197                    i = i + bma;
8198                    *tab = x + 1;         /* save min x */
8199                    tab += 2;             /* step to a new y */
```

© COPYRIGHT IBM CORP 1987

*FIG. 8F*

```
8200              *(tab +1 ) = x;              /* save max x (drawing toward min x) */
8201          }
8202        }
8203        *tab = x + 1;                      /* save last min x  */
8204        break;
8205
8206
8207      case 5:     /* always a min-line(ccw) */
8208        for( x = x -1; x > = x2; x-- ){
8209          if( i < 0 ){
8210            i = i + b2;
8211          } else {
8212            i = i + bma;
8213            *tab = x + 1;
8214            tab -= 2;
8215            *(tab + 1) = x;                 /* save min x (x was dec'd) on this y */
8216          }                                 /* step y */
8217        }                                   /* save max x (drawing toward min x) */
8218        *tab = x + 1;                       /* save last min x  */
8219        break;
8220
8221      case 6:     /* always a min-line(ccw) */
8222        for( y = y -1; y > = y2; y-- ){
8223          if( i < 0 ){
8224            i = i + b2;
```

FIG. 8G

© COPYRIGHT IBM CORP 1987

FIG. 8H

```
8225            } else {
8226                i = i + bma;
8227                x--;
8228            }
8229            tab -= 2;        /* step y */
8230            *tab = x;        /* save min x */
8231            *(tab +1) = x;   /* save max x */
8232
8233    #ifdef DB
8234        printf("           In oct = %d\n", oct);
8235        printf("           x = %3d, y = %3d \n",x,y);
8236    #endif
8237
8238        }
8239        break;
8240
8241        case 7:    /* always a min-line(ccw) */
8242        for(y = y -1; y > = y2; y --) {
8243            if (i < 0) {
8244                i = i + b2;
8245            } else {
8246                i = i +bma;
8247                x ++;
8248            }
8249            tab -= 2;        /* step y */
8250            *tab = x;        /* save min x */
8251            *(tab +1) = x;   /* save max x */
8252
8253    #ifdef DB
8254        printf("           In oct = %d\n", oct);
8255        printf("           x = %3d, y = %3d \n",x,y);
8256    #endif
8257
8258        }
8259        break;
8260
8261        case 8:    /* always a min-line(ccw) */
8262        for( x = x + 1; x < = x2; x ++) {
8263            if(i < 0) {
```

© COPYRIGHT IBM CORP 1987

```
8264            i = i + b2;
8265          } else {
8266            i = i + bma;
8267            *(tab + 1) = x - 1;   /*save max x */
8268            tab -= 2;             /* step y */
8269            *tab = x;             /* save min x for this y */
8270          }
8271        }
8272        *(tab + 1) = x - 1;       /*save last  max x */
8273        break;
8274
8275      default:
8276        break;
8277
8278    }  /* end of case */
8279
8280  }  /*  end of genline */
```

FIG. 8I

© COPYRIGHT IBM CORP 1987

| | 101 | 110 | | |
|---|---|---|---|---|
| 105 — | y0 | | xmin | — 106 |
| | y0 | | xmax | — 107 |
| | y1 | | xmin | |
| 103 — | y1 | | xmax | |
| | y2 | | xmin | |
| | y2 | | xmax | |
| | y3 | | xmin | |
| | y3 | | xmax | |
| | y4 | | xmin | |
| | y4 | | xmax | |
| 103 | ⋮ | ⋮ | | |
| 108 — ymin | y10 | 257 | xmin | — 106 |
| 109 — ymin | y10 | 257 | xmax | — 107 |
| | y11 | 257 | xmin | |
| | y11 | 259 | xmax | |
| | y12 | 256 | xmin | |
| | y12 | 261 | xmax | |
| | y13 | 256 | xmin | |
| | y13 | 263 | xmax | |
| | ⋮ | ⋮ | | |
| ymax | y31 | 259 | xmin | — 106 |
| ymax | y31 | 259 | xmax | — 107 |
| | ⋮ | ⋮ | | |
| | y47 | | xmin | — 106 |
| | y47 | | xmax | — 107 |
| | ⋮ | ⋮ | | |
| 107 — | y(screen size −1) | | xmin | |
| | y(screen size −1) | | xmax | |

FIG. 10

TABLE A (111)

| | min (116) | max (118) |
|---|---|---|
| y0 | | |
| y1 | | |
| y2 | | |
| ... | | |
| y10 | 257 | 257 |
| y11 | 257 | 257 |
| y12 | 256 | 257 |
| y13 | 256 | 256 |
| ... | | |
| y47 | | |
| screen size −1 | | |

TABLE B (112)

| | min (116) | max (118) |
|---|---|---|
| y0 | | |
| y1 | | |
| y2 | | |
| ... | | |
| y10 | 257 | 257 |
| y11 | 258 | 259 |
| y12 | 260 | 261 |
| y13 | 262 | 263 |
| ... | | |
| y47 | | |
| screen size −1 | | |

*FIG. 11*

COMPUTER PROGRAM PRODUCT FOR UTILIZING FAST POLYGON FILL ROUTINES IN A GRAPHICS DISPLAY SYSTEM

This is a continuation of application Ser. No. 07/130,851 filed Dec. 9, 1987, now U.S. Pat. No. 4,962,468.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to graphical raster displays, and more particularly to a system and method for filling in the area defined by the boundaries of a polygon that is being displayed on a graphical raster display system.

BACKGROUND ART

There is a general algorithm for filling polygons as described in J. D. Foley and A. Van Dam, *Fundamentals of Interactive Computer Graphics* (Addison-Wesley, 1982), pages 456–460. This general algorithm is referred to as an edge table driven algorithm. This type of algorithm is used in computer graphic applications as one of the standard routines that are called to perform certain graphic tasks. Some of these graphic tasks include drawing lines, circles, arcs, etc., including filling polygons. These tasks are typically supplied in a library containing graphical functions such as a Graphics Support Library (GSL). In general, a graphics support library is a package of graphic subroutines that are typically delivered with a processing system so that users can write to displays with a higher level interface without having to know the complexity of any particular display and how to write to that display.

For some simpler shapes of polygons, this algorithm becomes too time consuming. An algorithm becomes unduly time consuming when users of graphical applications have to wait after they have selected the polygon fill routine from a graphics library before the display screen displays the resulting filled polygon. It is important for customer satisfaction that the fill rate be as fast as possible without trading off the accuracy of the filled polygon.

In another known algorithm, the algorithm routine uses the Bresenham algorithm defined in J. E. Bresenham, "Algorithm for Computer Control of a Digital Plotter", *IBM Systems Journal*, Vol. 4, No. 1 (1965), pages 25–30. The Bresenham algorithm is also described in J. D. Foley and A. Van Dam, *Fundamentals of Interactive Computer Graphics* (Addison-Wesley), 1982), pages 433–436. The Bresenham algorithm is used to scan the lines of the polygon boundary, and to generate the points that make up the polygon boundary. However, this known polygon fill algorithm selects the first point after a change in the scan line. The problem with this algorithm is that it does not accurately fill within the boundaries of the polygon. The resulting displayed polygon will appear as if it is incompletely filled. That is, the fill does not reach the boundary of the polygon at all locations.

There are a variety of different shapes of polygons. Depending on the shape of a particular polygon, there may exist a polygon fill routine that is more efficient for that particular polygon shape than for other polygons having a different shape. The article "Method To Determine The Convexity of Polygons", IBM Technical Disclosure Bulletin Vol. 28 No. 5 October 1985 pages 2203 to 2208 discloses that for convex polygons, there exist filling algorithms which are more efficient than those for general polygons.

By referring to FIG. 1A, the above mentioned article states that a polygon 10 is convex if all of its interior angles at the vertices A, B, C, D, E, are less than 180 degrees. FIG. 1B illustrates a polygon 11 that is not convex by this definition since it has an interior angle at its vertex E which is greater than 180 degrees.

A method is disclosed in the article that determines whether or not all interior angles are less than 180 degrees, and therefore whether or not the polygon is convex. The method takes the cross product for each two adjoining vectors given by the edges of the polygon. If all of the cross products have the same sign, then the polygon is convex. The cross product indicates whether each side of the polygon is turning in the same direction. As shown in FIG. 1A, proceeding around the polygon 10 in the direction shown by the arrow 12 and starting at vertex E, all turns are to the left. However, in FIG. 1B, proceeding around the polygon 11 in the directions shown by the arrow 13 and starting at vertex D, all turns are to the left, except the turn at vertex E which is to the right.

The above test would thereby classify the polygons 20, 21 shown in FIG. 2A and 2B as being convex since all interior angles are less than 180 degrees. Also, as shown in either FIG. 2A or FIG. 2B, in proceeding around the polygon 20, 21 in the direction shown by the arrow 22, 23 and starting at vertex B, all turns are to the left. However, the polygons 20, 21 shown in FIG. 2A and 2B have crossing lines and turn more than once around. These type of polygons are more complex and are not accurately filled by the simpler and more efficient fill algorithms previously known in the art. Therefore, the method described in the above mentioned article does not correctly determine the convexity of polygons for all types of polygons.

Another problem is that the previous methods of testing polygons classified polygons having shapes as shown in FIG. 3A and 3B together with all other general polygons. The polygons 30, 31 of FIG. 3A and FIG. 3B are known as having x-concavity. Also, the polygon 31 of FIG. 3B has both x-concavity and crossing lines.

SUMMARY OF THE INVENTION

An object of this invention is to accurately fill a polygon by including the points in the Bresenham algorithm that define the boundaries of the polygon in the resulting filled polygon.

A further object of this invention is to accurately determine whether a polygon is convex for any given type of polygon.

A further object of this invention is to utilize a fast fill routine for convex polygons that appears to a user to completely fill the polygon up to and including the boundaries of the polygon.

A further object of this invention is to utilize a second fast fill routine for polygons having x-concavity with no crossing lines, and for polygons having x-concavity with crossing lines.

The system and method of this invention implements one of three polygon fill algorithms for optimizing the processing time required to fill a polygon depending upon the particular shape of the polygon. Several tests are used on the polygon to determine if the polygon falls within the class of polygons to be filled by a particular polygon fill algorithm.

For one class of polygons, strictly convex polygons, the processing time required for filling a polygon is optimized by a first polygon fill algorithm by storing one maximum value for each scan line of the polygon for one half of the polygon, and one minimum value for each scan line of the polygon for the other half of the polygon. This algorithm stores exactly one value since the algorithm knows whether at any particularly point along the polygon, the point is part of the maximum or minimum values.

For another class of polygons, x-concavity polygons, the first polygon fill algorithm is inadequate to accurately fill a polygon within this class of polygons. In this class of polygons, the processing time required to accurately fill a polygon is optimized by storing two minimum and maximum values for each scan line of a polygon. The fill line is then drawn from the least minimum value to the greatest maximum value for each scan line.

The first polygon fill algorithm fills polygons that are strictly convex. The second polygon fill algorithm fills a larger set of polygons than the first polygon fill algorithm. The second polygon fill algorithm fills all polygons which can be filled with exactly one continuous line per scan. Polygons in this set may have x-concavity and crossing lines.

The first polygon fill algorithm checks the polygon to determine if the polygon is strictly convex by checking for the combination of two conditions. First, the polygon is checked for consistent "turning" direction. That is, determining whether each sequential line of the polygon bend in the same direction. As a result of this test, the direction is determined as being clockwise or counter clockwise. For any two adjacent lines with points (x0, y0), (x1,y1), x2,y2), the calculation for the sign of the vector product is as follows:

(y1–y0)*(x2–x1)–(y2–y1)*(x1–x0)

If the above expression is greater than zero, then the polygon is turning right, or clockwise. If the above expression is less than zero, then the polygon is turning left, or counter clockwise. If all adjacent lines have the same vector product sign, the polygon meets this first condition as having a consistent "turning" direction.

The second condition that must be met for the polygon to be strictly convex is the once around y direction test. This is equivalent to having the sum of the interior angles equal to 360 degrees.

The "once around test" states that if the starting location is the lowermost vertex, and the polygon is traversed sequentially along its edges, the y coordinates of the sequential edges must first all increase and then decrease. In other words, a first group of edges of the polygon must first all rise, and the second group of edges of the polygon must all then fall.

The once around condition is met if by starting at the first line of the polygon the algebraic sign of y(i+1)–y(i) for all adjacent vertices changes exactly 2 or 3 times. Horizontal lines are considered to have the same sign as the previous line. Polygons passing this test have y-convexity. That is, for any value of y there is one and only one continuous fill line. While traversing around the points of the polygon for the "once around" test, the maximum and minimum y values and locations are stored in memory.

If the consistent turning direction test and the once around test are met, the polygon is strictly convex. The lines of the polygon can be partitioned into two sets such that the lines of one set defines maximum values of scan lines, while the other set defines minimum values.

For a strictly convex polygon, a single table of two values per y value is used. The y value ranges from zero to the largest number of scan lines on the display of interest. Starting at the point of the minimum y value and proceeding in a counter clockwise direction, for each line of the polygon the maximum value of that line for every scan line that it intersects is saved in a table. An exception is made for vertexes having two lines that intersect on the same scan line. Special processing is used to store one maximum value on that scan line of a pel that both lines may share. This is continued for each line of the polygon until the maximum vertex in the y direction (ymax) is reached. From this point on, the lines define only minimum scan lines. For each line of the polygon, the minimum value of that line for every scan line that it intersects is saved in the table. Again, an exception is made for vertexes having two lines that intersect on the same scan line. Special processing is used to store one minimum value on that scan line of a pel that both lines may share. After filling the table by traversing all of the lines of the polygon, the GSL multiline draw routine is called in one preferred embodiment to draw one horizontal line per y in the range ymin to ymax. Other preferred embodiments may use other methods to draw a line from the selected minimum pel to the selected maximum pel for each scan line.

The second polygon fill algorithm fills a larger set of polygons than the first polygon fill algorithm. All polygons can be filled with this second polygon fill algorithm if the polygon can be filled with exactly one continuous line per scan line. Polygons in this set have x-concavity and/or crossing lines.

The only check is for the once around in the y direction condition as described above. Also, the ymin and ymax values and their associated vertices are recorded. In this case, there is no knowledge about whether the direction is clockwise or counter clockwise. In fact, in polygons with crossing lines, the clockwise and counter clockwise distinction is irrelevant.

The lines of the polygon are again divided into two sets, those between ymin and ymax in the order originally presented. Lines of the polygon in either set may define a minimum or maximum on a given scan line. Therefore, two tables are used to store either the minimum or the maximum value, one for each set of lines.

Starting at the point of the minimum y value of the polygon and proceeding through the first set of lines, both the minimum and maximum of a given line at the intersection with a scan line are stored. As the polygon is traversed, the second table likewise stores the minimum and maximum values of a given line at each intersection with a scan line for the second set of lines in the polygon.

The minimum value for a given scan line is the minimum of the two values for that scan line from the two tables. Likewise, the maximum value for a given scan line is the maximum of the two values for that scan line from the two tables. At this point, either the two tables are scanned and combined to one table and the GSL multiline function is called; or pointers to both tables are passed to a new GSL multiline routine that combines them as it calls for each horizontal line to be drawn. Other preferred embodiments may use other methods to draw a line from the selected minimum pel to the selected maximum pel for each scan line.

In the above polygon fill algorithms, there are two stages of the algorithm. The first stage scans all the lines of the polygon. For each line of the polygon, the Bresenham algorithm is utilized on each point along a line of the polygon. The processing time required to fill a polygon is optimized since the determination of whether the value of a point is to be stored in a min/max table is made at the time the Bresenham algorithm operates on that particular point. In this way, the second stage, the post processing is done integrally with the preprocessing, the first stage. Once the first stage, the preprocessing is complete, only a minimal amount of additional processing is needed to fill the polygon.

The second stage, the post process, is virtually nonexistent for the first polygon fill routine. As the Bresenham algorithm operates, a single store is performed in a table having a minimum and maximum value for each y value of each scan line. In the post processing, the polygon is filled by scanning the array from ymin to ymax, and drawing a line from the minimum to the maximum value stored for each y value.

In the post processing of the second polygon fill algorithm, the polygon is filled by first determining the maximum of the maximum values stored, and the minimum of the minimum values stored for each y value. A line is then drawn from the least minimum value to the greatest maximum value for each y scan line.

BRIEF DESCRIPTION OF THE DRAWING

FIG. 4A, 4B, 4C, 4D, 4E, 4F, 4G and 4H represents the code in C language of the main driver program that calls the first polygon fill algorithm and the second polygon fill algorithm.

FIG. 5A, 5B, 5C and 5D represents the code in C language for the front end, gsff, of the first polygon fill algorithm.

FIG. 6A, 6B, 6C, 6D, 6E, 6F and 6G represents the code in C language for the first polygon fill algorithm.

FIG. 7A, 7B, 7C and 7D represents the code in C language for the front end, gsff2, of the second polygon fill routine.

FIG. 8A, 8B, 8C, 8D, 8E, 8F, 8G, 8H and 8I represents the code in C language for the second polygon fill routine, genline2.

FIG. 10 illustrates an array used with the first polygon fill algorithm.

FIG. 11 illustrates the two arrays that are used with the second polygon fill algorithm.

DESCRIPTION OF THE PREFERRED EMBODIMENT

Figure 1A:
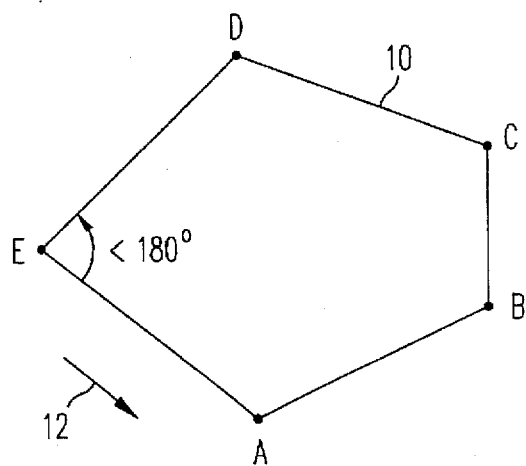
FIG. 1A illustrates a polygon that is convex as defined by prior art methods.
Figure 1B:
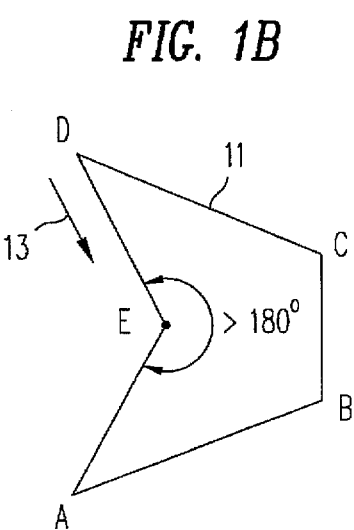
FIG. 1B illustrates a polygon that is not convex as defined by prior art methods.
Figure 2A:
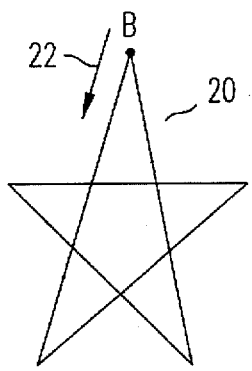
FIG. 2A illustrates a polygon that is convex as defined by prior art methods.
Figure 2B:
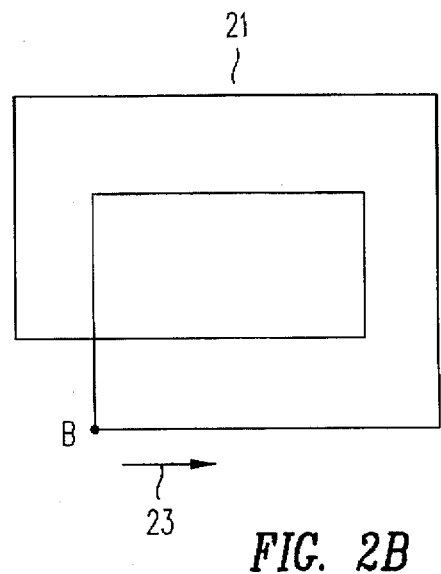
FIG. 2B illustrates a polygon that is convex as defined by prior art methods.
Figure 3A:
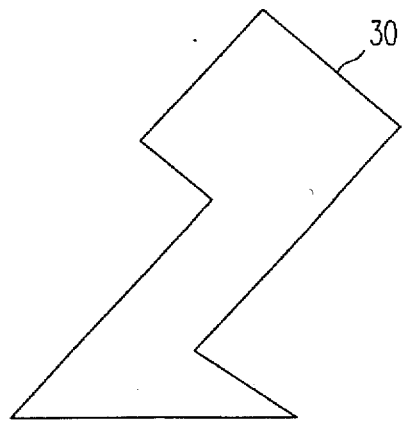
FIG. 3A illustrates a polygon classified as a general polygon for utilizing a general polygon fill algorithm.
Figure 3B:
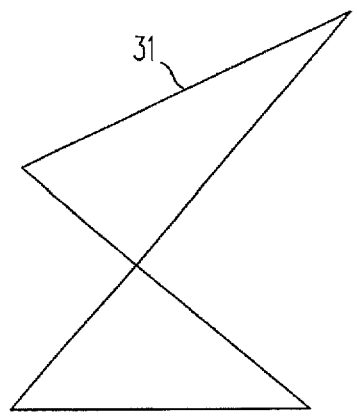
FIG. 3B illustrates a polygon classified as a general polygon for utilizing a general polygon fill algorithm.
Figure 9A:
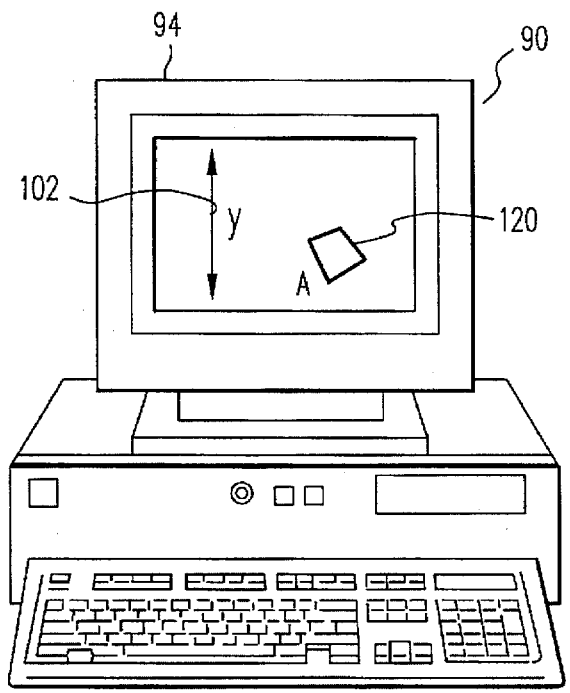
FIG. 9A illustrates the hardware including a display of a processing system for utilizing this invention.
Figures 9B, 9C:
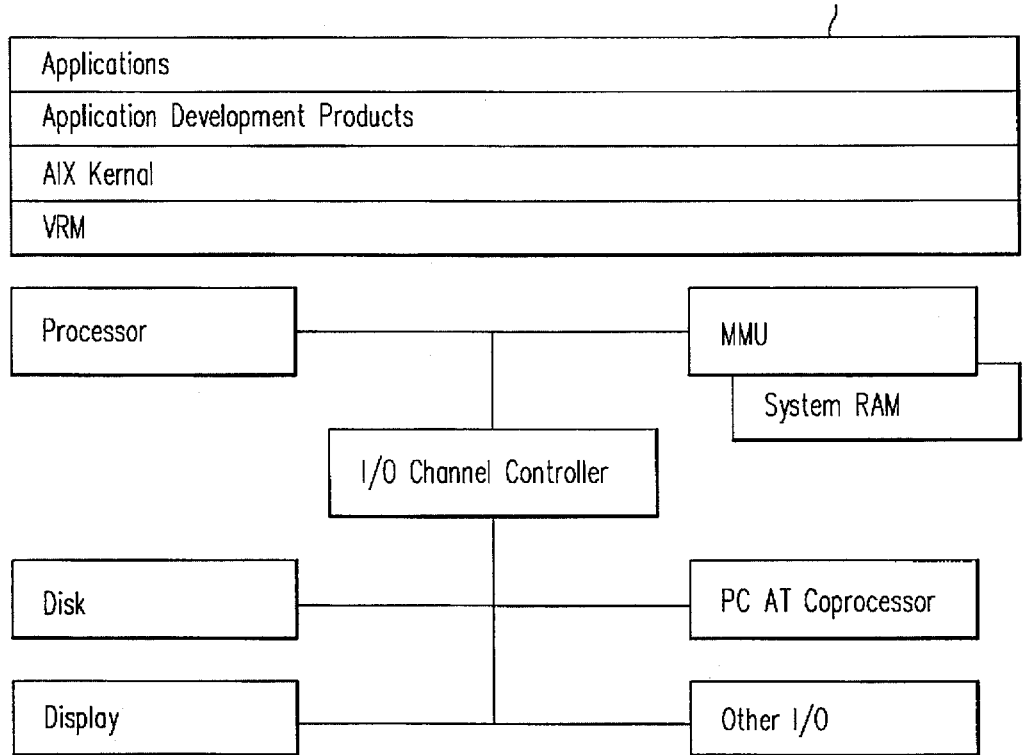
FIG. 9B illustrates the logical structure of the processing system.
FIG. 9C illustrates the physical structure of the processing system.

The present invention comprises two algorithms 60, FIG. 6A, 6B, 6C, 6D and 80 FIG. 8A, 8B, 8C, 8D for faster polygon filling. These algorithms 60, 80 could be used with displays 94 (FIG. 9A) provided with a processing system 90 such as the IBM RT PC. FIG. 9B shows the logical structure 91 of the processing system 90. FIG. 9C shows the physical structure 92 of the processing system 90. The RT PC is more fully described in *IBM RT Personal Computer Technology*, Form No. SA23-1057, which is herein incorporated by reference. Each algorithm 60, 80 has advantages and disadvantages. Depending on the relative processor, display adapter, memory, and I/O speeds, one or the other algorithms will be more efficient for a particular implementation for a given display.

Both polygon fill algorithms 60, 80 are used to fast fill certain polygons having a specific classification of shape. The first fast polygon fill routine 60 utilizes one table 100 (FIG. 10) for storing values 110 at each y location 101, and the second fast polygon fill routine 80 utilizes two tables 111, 112 (FIG. 11) for storing values 113 at each y location 101 that are needed to fill a polygon.

The size of the table 100 (FIG. 10), 111, 112 (FIG. 11) that is required depends upon the size of the particular display screen 94 (FIG. 9A) that is being used. If the display 94 that is being used is a monochrome display having 375 picture elements (pels) in the y direction 102, the table 100, 111, 112 needs 375 entries 103. If the display 94 (FIG. 9A) is an APA8 display which has 512 pels in the y direction 102, then the table 100, 111, 112 needs 512 entries 103. If the display 94 (FIG. 9a) is a megapel display which has 1024 pels in the y direction 102, the table 100, 111, 112 needs 1024 entries 102. The y entries 101 in the table 100, 111, 112 would range from zero 105 to the size of the screen minus one 107. The table 100, 111, 112 is therefore sized according to the size of the display 94.

The polygon fill algorithms 60, 80 are arranged so that if the actual polygon 120 (FIG. 9A) (not shown to scale) in the y direction ranges from pels having the value of y=10 to y=47, the table 100 (FIG. 10), 111, 112 (FIG. 11) does not have to be initialized for each positioning of the polygon 120. Only the entries 103 in the table 100, 111, 112 having the y values 101 within the polygon range (y=10 to y=47) in the y direction 102 (FIG. 9) are used. If the lowermost vertex A of the polygon 120 beings at the 10th pel in the y direction 102 from the bottom of the screen display 94, the table 100, 111, 112 does not have to be initialized so that the zero entry 105 represents vertex A at the 10th pel position. If the polygon has a total height of 37 pels, only the 11th through 48th entries 103 into the table 100 would be utilized.

The second algorithm 80 utilizes two tables 111, 112 shown in FIG. 11. Each table, 111, 112 has a minimum column 116 and maximum column 118. The tables 111, 112 also have a size that range from zero 105 to the size of the screen minus one 107.

Figure 12:
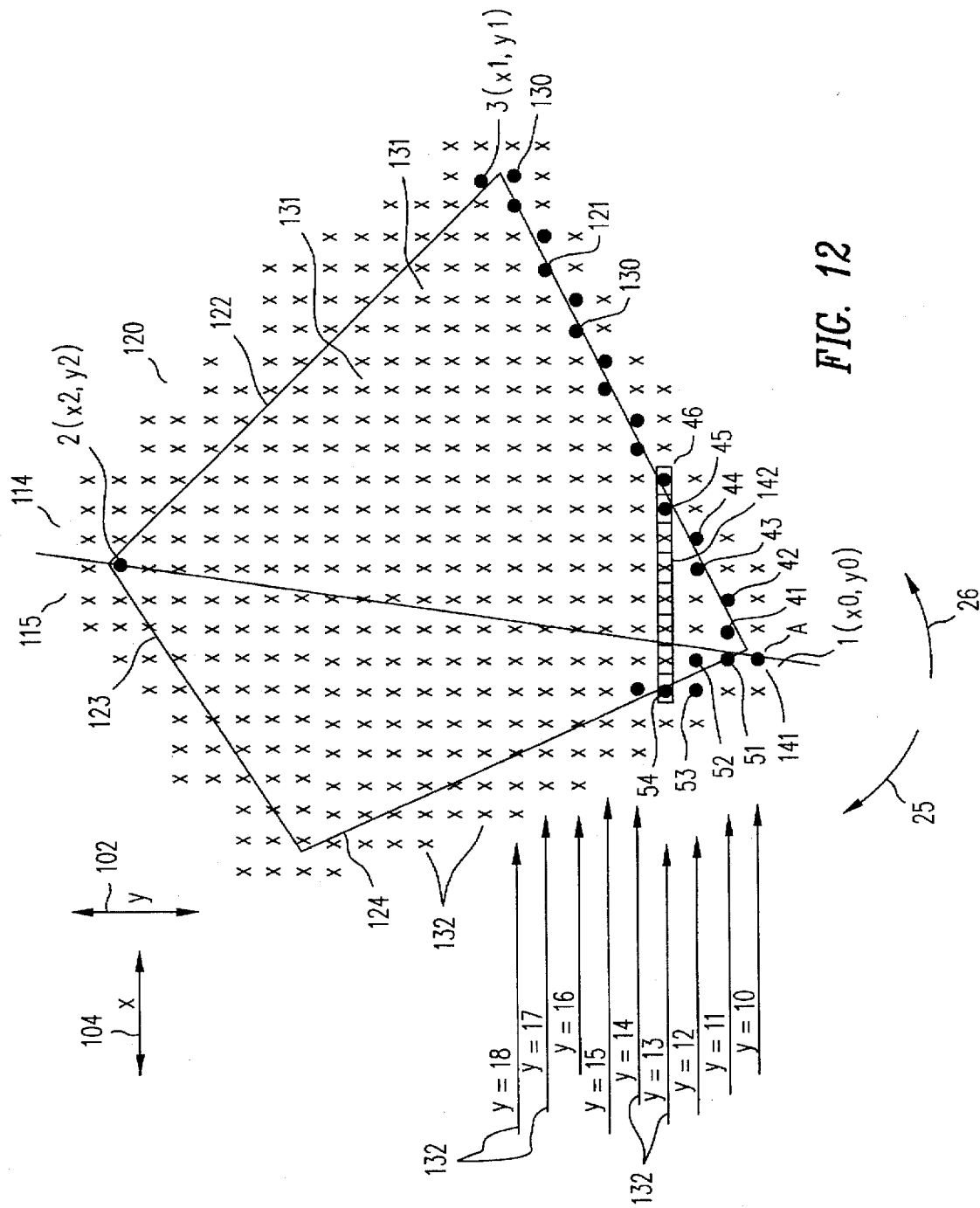
FIG. 12 illustrates a polygon displayed by pels which is filled by the first and second polygon fill algorithm of this invention.

Referring to FIG. 12, as shown on a display 94 (FIG. 9A), the lines 121–124 of polygon 120 are represented by picture elements (pels) such as pels 130 that are turned on throughout scan lines 132 y10–y18 to represent the line 121 of polygon 120. The lines 121–124 of polygon 120 are not actually displayed on the screen 94 (FIG. 9A), but are shown here for description purposes only. Determining which pels 130 are to be turned on for each scan line 132 to best represent each of the lines 121–124 when displayed is accomplished by utilizing the Bresenham algorithm as described in J. E. Bresenham, "Algorithm for Computer Control of a Digital Plotter", *IBM Systems Journal*, Vol. 4, No. 1 (1965), and in J. D. Foley and A. Van Dam, *Fundamentals of Interactive Computer Graphics* (Addison-Wesley), 1982, which are herein incorporated by reference.

In both polygon fill algorithms 60, 80, the points 130 of a polygon 120 (FIG. 12) are generated by using the Bresenham algorithm. The pels 130 selected by the Bresenham algorithm to represent the line 121 are shown in FIG. 12 as filled in zero's. The pels 131 not selected by the Bresenham algorithm to represent a line 121 of the polygon 120 are shown in FIG. 12 as x's. There is a set of scan lines 132 representing each sequential row or pels 130, 131 in the y direction 102. For each line 121, 122, 123, 124 of the polygon 120, points 130 are generated on one scan line 132 at a time to represent collectively a line 121, 122, 123, 124 of the polygon 120.

Figure 13A:
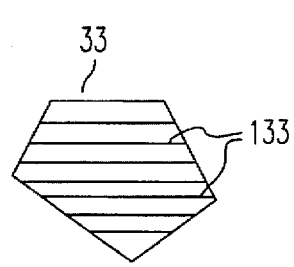
FIG. 13A represents a class of polygons that can be filled by the first polygon fill algorithm and the second polygon fill algorithm.
Figure 13B:
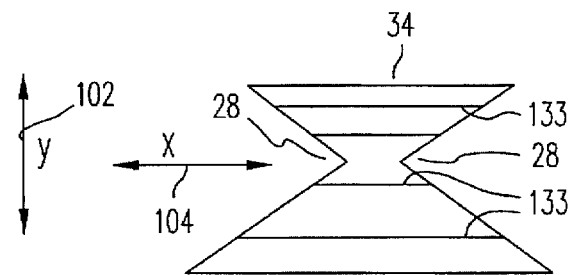
FIG. 13B, 13C represents a class of polygons that can be filled by the second polygon fill algorithm.
Figure 13C:
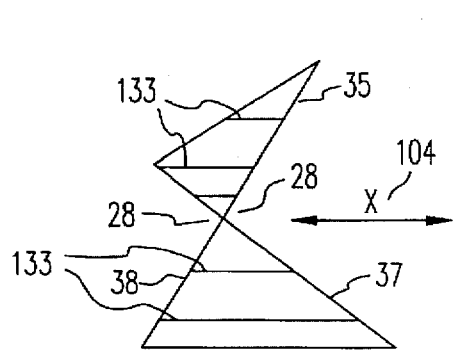
Figure 13D:
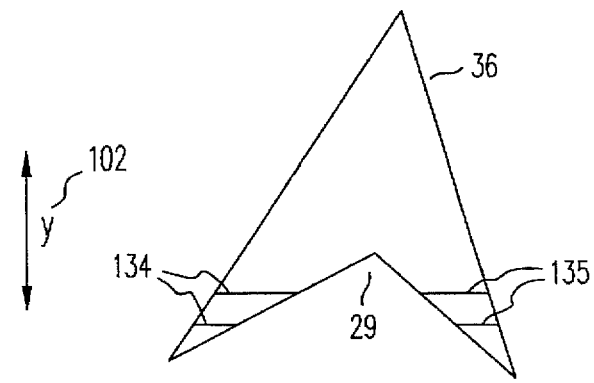
FIG. 13D represents a class of polygons that cannot be filled by either the first or second polygon fill algorithm.

The two polygon fill algorithms 60, 80 each have a different range of a set of polygons 33 (FIG. 13A), 34 (FIG. 13B), 35 (FIG. 13C) that can be filled with the particular algorithm. The second algorithm 80 can fill a larger set of polygons 33, 34, 35 than the first algorithm 60. This set includes the set of all polygons that can be filled such that for each y value 102 there is a unique single line 133 that can be used to fill the polygon 33, 34, 35. This set of polygons 33, 34, 35 can include polygons that are concave 28 in the x direction 104. Additionally, this set includes polygons 35 having crossing lines 37, 38. Polygon 36 (FIG. 13D) illustrates that for each y value 102, there is not a unique single line that can be used to fill the polygon 36. For the lower values of y, there are two lines 134, 135 for each value of y. Therefore, a polygon 36 that is concave 29 in the y direction can not be filled using the second polygon fill algorithm 80. For the first polygon fill routine 60, the set of polygons only includes strictly convex polygons 33. There can not be any concavity in either x or y direction, and no crossing lines.

Therefore, there is a front end 50 (FIG. 5A, 5B), 70 (FIG. 7A, 7B) for each algorithm 60, 80 respectively, that determines whether the polygon fits within the range of polygons for that particular polygon fill algorithm. The following describes the tests that are performed on the polygon to determine in which range of polygons a particular polygon belongs.

The following discussion will center around the polygon 120 in FIG. 12. To begin, a discussion as to the definition of the term direction sensitivity of a polygon is needed. The same polygon 120 can be described by a sequence of x and y coordinates in either a clockwise 25 or counter clockwise 26 order around the polygon 120. The application of any given polygon fill algorithm should have the same result whether the polygon fill algorithm was applied to the polygon in a clockwise 25 or counterclockwise 26 direction. That is, the polygon should result in the same fill regardless of the direction the polygon 120 was traversed in applying the polygon fill algorithm 60, 80. In both of the polygon fill algorithms 60, 80 of this invention, there is no direction sensitivity regardless of the order that the coordinates of the resulting Bresenham pels 130 are presented. In addition, the first test for the first polygon fill algorithm 60 for strictly convex polygons determines the direction, clockwise 25 or counterclockwise 26, that the polygon is traversed in presenting the coordinates of the corresponding pels 130 of the polygon 120. The first polygon fill algorithm 60 is not direction sensitive since the direction is specifically detected as part of the test for this polygon fill algorithm. If the direction is found to be clockwise 25, the order that the points (pels) 130 are scanned is reversed. The points 130 are always scanned counterclockwise 26 around a polygon.

In the second polygon fill algorithm 80, there is no direction sensitivity because there are two tables 111, 112 (FIG. 11) for each side 115, 114 of the polygon 120. Each table 111, 112 has minimum 116 and maximum 118 values in the x direction 104 for each scan line 132 in the y direction 102. Therefore, it does not matter if the polygon 120 is traversed up one side 114 and down the other 115 or vice versa. The result is two tables 111, 112 with minimum 116 and maximum 118 values in each table 111, 112 for each scan line 132 in the y direction 102. For each scan line 132, the maximum value of the two maximum values 118 for the two tables 111, 112 is selected, and the minimum value of the two minimum values 116 for the two tables 111, 112 is selected. A fill line is then drawn from the selected minimum pel to the selected maximum pel.

This is illustrated by referring to FIG. 11 and FIG. 12. For scan line 132 representing the y value 101 of y=13, the maximum value 118 for line 121 of the polygon 120 is pel 46 having a value 118 in this example of x=263. This value would be stored in Table B 112. The minimum value 116 for line 121 of polygon 120 at scan line y=13 is x=262 at pel 45. This value of x=262 would then be stored in Table B 112 of entry y=13. For line 124 of polygon 120, at scan lines 132 of y=13 the value of the pel 54 is x=256. Since there is only one pel 130 that is turned on by the Bresenham algorithm for line 124 at this scan line, this value is both the maximum and minimum value of x at y=13. This value of x=256 is stored in Table A at entry y=13. From Table A 111 and Table B 112, the maximum of the maximum values 118 is 263 for y=13, and the minimum of the minimum values 116 is 256 for y=13. A fill line 142 is then drawn from pel 54 to pel 46 by turning on all the pels 130, 131 there between as indicated by the symbol "#" at each pel location.

For the first polygon fill routine 60, there is a determination as to whether the polygon 120 fits into the range of polygons for this particular fill algorithm. There are three parts to this test which are included within the front end 50 (FIG. 5A, 5B) of the first polygon fill algorithm 60 (FIG. 6A, 6B, 6C, 6D). The clockwise/counterclockwise test, line 5071 FIG. 5A, the once around test in either the x or y direction, line 5080 FIG. 5A, and the determination of y minimum and y maximum, line 5084 FIG. 5A, for the particular polygon.

If the polygon meets these tests, the first polygon fill routine called genline 60 FIG. 6A will be called from the gsff routine 50 at line 5144, FIG. 5B. If the polygon fails any one of these tests, there will be an escape out, line 5106 FIG. 5A, to the general fill algorithm as described in J. D. Foley, A. Van Dam, *Fundamentals of Interactive Computer Graphics*, pages 456–460, which is herein incorporated by reference.

The first test for the first polygon fill algorithm 60 is the clockwise/counterclockwise test, otherwise referred to as the turning test 57 FIG. 5A. This text is described in "Method To Determine the Convexity of Polygons", *IBM Technical Disclosure Bulletin*, Vol. 28, No. 5, October 1985, which is herein incorporated by reference.

More specifically, the preferred embodiment of this invention incorporates this turning test 57 to check for consistent turning direction. That is, going from line to line of a polygon, it is determined whether each new line bends in the same direction. As a fallout of this test, clockwise or counterclockwise is also determined. If two adjacent lines 121, 122 (FIG. 12) has points (x0,y0), (x1,y1), (x2,y2), the calculation for the sign of the vector product is as follows:

(y1−y0)*(x2−x1)−(y2−y1)*(x1−x0)

If the above expression is greater than zero, then the polygon 120 is turning right for those two lines of the polygon. In this example, the vector product of lines 121 and 122 of polygon 120 would be less than zero indicating that the polygon 120 is turning left or counterclockwise 26. This turning test 57 is repeated for each two adjacent lines of the polygon, line 5089 FIG. 5A. If the results of this test for the same polygon result in the same sign, the polygon meets the consistent turning direction test 57.

The second condition that must be met for the polygon to be strictly convex is the once around y direction test 58, FIG. 5A. This is equivalent to having the sum of the interior angles equal to 360 degrees.

The "once around test 58" states that if the starting location for traversing the polygon begins at the lowermost vertex 1 (FIG. 12), and the polygon is traversed sequentially along its edges 121, 122, 123, 124, the y coordinates 102 of the sequential edges 121, 122, 123, 124 must first all increase and then decrease. In other words, a first group of edges 121, 122 of the polygon 120 must first all rise, and the second group of edges 123, 124 of the polygon 120 must all then fall.

The once around condition 58 is met if by starting at the first line 121 of the polygon 120 the algebraic sign of y(i+1)−y(i) for all adjacent vertexes changes exactly 2 or 3 times. Horizontal lines are considered to have the same sign as the previous line. Polygons passing this test have y-convexity. That is, for any value of y 102 there is one and only one continuous fill line 142. While traversing around the points 130 of the polygon 120 for the "once around" test 58 (FIG. 5A), the maximum and minimum y values and locations are stored in memory. Before the Bresenham algorithm is used in this polygon fill algorithm, the y maximum 2 and y minimum 1 values are initialized in the table 100 with the x value at those locations. This same x value for y maximum 2 is stored in both the max 107 and min 106 entries in the table 100 for the y maximum entry 103. Likewise, the same x value for y minimum 1 is stored in both the max 107 and min 106 entries in the table 100 for the y minimum entry 103.

The consistent turning direction test 57 along with the once around in the y direction test 58, which is equivalent to stating that the sum of the angles inside the polygon is 360 degrees, state that the polygon 120 has strict convexity. As a result of passing these two tests 57, 58, the sign of the vector product calculated in the consistent turning direction test 57 is then used to determine the direction of the polygon 120. If the value of the above expression is greater than zero, then the polygon 120 was traversed in a clockwise direction 25. If the value of the above expression is less than zero, then the polygon 120 was traversed in a counterclockwise direction 26. Since the first polygon fill algorithm 60 (FIG. 6A, 6B, 6C, 6D) is based on a counterclockwise direction 26, if the sign of the expression indicates a clockwise direction 25, the order that the points 130 are traversed is reversed.

Referring to FIG. 12, once the polygon 120 is determined to have strict convexity as stated above, the lines 121, 122, 123, 124 of the polygon 120 can be partitioned into two sets 114, 115 such that the lines 121, 122 of one set 114 defines maximum values 107 (FIG. 10) of scan lines 132, while the other set 123, 124 defines minimum values 106 (FIG. 106). Regardless of the presentation of the polygon 120 through the preprocessing of the polygon in the above tests 57, 58, vertex 1 will be determined to be y minimum, and vertex 2 will be determined to be y maximum.

Traversing the polygon 120 from y minimum 1 in a counterclockwise direction 26 to y maximum 2, the maximum value of a scan line 132 is stored in the max entry 107 (FIG. 10) of the table 100 for the appropriate index 103 of y. As the first polygon fill algorithm 50, 60 proceeds from one scan line 132 to the next sequential scan line 132, the maximum value 107 of x at the previous scan line is stored. This is repeated for each scan line 132 of y until y maximum 2 is reached. Once y maximum 2 is reached, the polygon 120 is traversed down from y maximum 2 to y minimum 1 down the lines 123, 124 that were previously partitioned. For this set 115 of partitioned lines 123, 124, the last point 130 on the scan line 132 is stored as the minimum value 106 of x in the table 100 for each y entry 103. This is repeated for each y scan line 132.

For the first polygon fill algorithm 60, the algorithm begins at y minimum (pel 1, FIG. 12) and proceeds in a counterclockwise direction 26 to y maximum shown as pel 2. During this traverse from y minimum 1 to y maximum 2, table 100 having min and max entries 110 for each y 102 is used. The maximum x value (which is the last point (pel) 130 on a scan line 132) for each y 102 is stored in the table 100. Once y maximum 2 is reached in the traverse, the polygon is traversed from y maximum 2 to y minimum 1. During this part of the polygon traverse, the minimum value for a pel 130 on each scan line 132 is stored in the table. In other words, it is the last point 130 that is scanned on the previous scan line after proceeding to the next y scan line. Going from the lowermost vertex 1 to the higher most vertex 2 of the polygon 120 in counter clockwise direction 26, the maximum value is stored in the array. Going from the higher most vertex 2 to the lower most vertex 1 in counter clockwise direction 26, the minimum value is stored in the array.

For example, traversing the polygon 120 counterclockwise 26 starting with line 121, the x value at pel 42 would be stored at the max entry 107 for the y entry 103 at y=11 representing scan line 132 for y=11. For the next scan line 132 of y=12, the value of pel 44 would be stored at the maximum entry 107 for the y entry 103 of y=12. This is repeated for each scan line 132. Likewise, traversing the polygon 120 down from vertex 2, the minimum value for a pel 130 at a scan line 132 would be stored in the minimum entry 106 for the corresponding y entry 103. For example, the value of pels 54, 53, 51 would be stored at the minimum entry 106 for scan lines 132 representing y=13, y=12, and y=11 respectively in table 100.

As seen in FIG. 5A, 5B which lists the code in C language for the first polygon fill algorithm 50 called gsff, the first argument, inlines, 151 is the number of lines 121–124 in the polygon 120. The second argument, inx, 152 is the array of x points in the polygon 120. The third argument, iny, 153 is the array of y points in the polygon 120. These first three parameters 151, 152, 153 are the input parameters. The xs argument 154 is a pointer to the beginning of the array 100 which contains both min 106 and max 107 values in an alternating fashion as shown in FIG. 10. The first entry is x min 106 at y=0, the second entry is x max 107 at y=0, the third entry is x min 106 at y=1, the fourth entry is x max 107 at y=1, and so forth. This continues for the size of the screen minus 1, such as 1023 for a screen having 1024 pels in the y direction 102. The ys argument 155 is just an implementation detail such that it is simply an array of points 0,0,1,1,2,2,3,3, etc. to the size of the screen minus one, i.e., 1023, 1023. The ys array 101 is initialized once, line 5052. When this array 101 is called, it is called with an x 110 and y 101 pair to get the right y with the x.

Lines 5057 to 5087 initializes the once around y test and the turning test. Lines 5095–5097 is the expression used for the turning test. Lines 5084 to 5087 initialize y min and y max at the first point. Next, there is a for loop, line 5089, which performs the three tests as previously discussed. The for loop keeps calculating the turning test lines 5090–5097, it updates y min and y max, lines 5109–5111, and it updates the once around test, lines 5099–5102. In the once around test 58, line 5099–5102,the new sign is equal to 0 if it is negative, and 1 if it is positive. One is added to the count if the new sign is not equal to the old sign. This counts the number of changes in the sign. If the direction outside of the loop is different from the direction that was just calculated, or if the count of the number of changes in the sign of y is four or greater, line 5104, the test fails, line 5105, and the loop is exited, line 5106. If the test does not fail, the algorithm continues as follows.

The next step, line 5109, is the y high test. If the new y is higher than the previous y max, the y max is updated to the new value. The index where the new y max was found is stored. The same is done with the minimum. If the maximum was not exceeded, the y min value is checked to see if the new y value is less than the previous y min value. If it is, the y min value is updated with the new y min value. The index is also updated to note the location of the y min value. This ends the loop at line 5112. Lines 5089 to 5112 are the pretest. The gsff algorithm 50 continues at line 5114 if the fail flag was not set during the pretest.

Line 5114 shows that the total number of points for the y array 101 (FIG. 10) is two times the sum of y max minus y min plus one. Lines 5116 to 5118 is a conditional print out for debugging purposes. Lines 5119–5134 is diagnostic output. If the fail flag equals one, the pretest failed. If the directions are different, the algorithm prints out that the convexity test failed. If the change in sign is more than or equal to four, the algorithm prints out that the around test failed.

This is the point, at line 5125, in the application code that a more general algorithm would be called to fill the polygon if the pretest failed. If the pretest fails, the first polygon fill routine cannot be used for the type of polygon that is selected by the user to be filled.

Line 5140 states that if the direction is zero, then it is already counterclockwise, and the points 130 are scanned from the low point in a counter clockwise direction for each line 121–124, in the polygon. Lines 5140 to 5153 show how the lines in the polygon are scanned if the low point is not the first line of the polygon.

Line 5144 is the actual call, genline 60, to the heart of the first polygon fill algorithm. The steps prior to line 5144 insured that the right line was pointed to and that it was counter clockwise, etc.

Genline 60, line 5144 (FIG. 5B), has five arguments. The first argument 154 is an address to the min/max array 100 (FIG. 10) in which values of xmin 106 and xmax 107 for each y value 103 are stored. The next two arguments 152, 153 are the x and y of the jth point in the scan, the next two arguments 156, 157 are the x and y of the point immediately after the jth point. Therefore, genline 60 is called with a pointer into the array 100, and a line described by an x and y for a first pel and the next adjacent x and y for the second pel.

Figure 14:
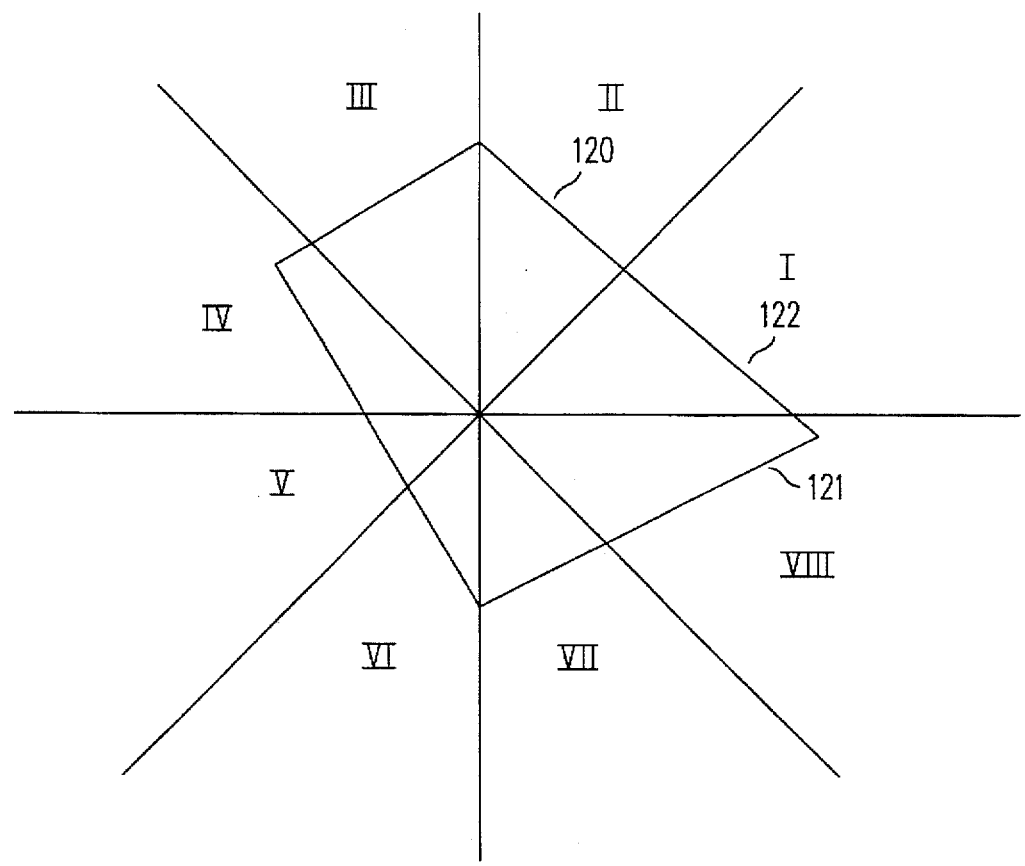
FIG. 14 illustrates the arrangement of a polygon in octants.

Genline 60 computes the minimum 106 and maximum 107 values for each y value of a scan line 132. It is assumed that the polygon 120 is strictly convex and the polygon 120 is presented in a counterclockwise 26 order. Therefore, the polygon 120 can be filled with a single horizontal line 142 for each value of y 102. Only one table 100 is used, and only one minimum 106 and maximum 107 value is saved in this table 100 for each scan line 132. A line with multiple pels 130 at the same y 102 is handled by only updating x when y changes. For lines in octants I, II, VII, VIII the update will be maximum 107, while for octants III, IV, V, VI the update will be minimum 106. As shown in FIG. 14, the octant I begins at 0 degrees where y is zero and x is any positive value and terminates at 45 degrees. Octant II ranges from 45 degrees to 90 degrees. This continues in likewise fashion for octants I–VIII. A line of a polygon is in octant I if the line's angle is between zero and 45 degrees. A line of a polygon is in octant II if the angle of the line is between 45 degrees and 90 degrees. A line of a polygon is in one of the eight octants depending on the angle of the line. The polygon 120 is organized within these octants such that as the polygon is traversed up the front face 121, 122, the points can only lie in octants VII, VIII, I, II.

The table 100 (FIG. 10) is unique to this procedure, but could be used for other implementations. The key is that since there is only one x minimum 106 and one x maximum 107 for each y 103, all y's are constant and are computed only once at initialization. The table is organized as illustrated in FIG. 10 as follows:

| y0 | xmin |
| y0 | xmax |
| y1 | xmin |
| y1 | xmax |
| y2 | xmin |
| y2 | xmax |
| . | . |
| . | . |
| ymax | xmin |
| ymax | xmax |

The xmin is initialized for the ymax, and the xmax is initialized for the ymax. This eliminates having to save the x value, minimum or maximum, at the first point of a line. The first point 141, 161 (FIG. 12) is excluded when drawing a line, but every point 130 after that is included. Only the portion of the table 100 from ymin 1 to ymax 2 of the given polygon 120 is used for filling the polygon.

Therefore, genline 60 generates the points 130 for one line 121–124 of the polygon 120. Line 6049 and line 6050 generates the slope of the line. Line 6055 calculates the address of the present location in the array. This points to the minimum of x 106 in the table 100 at the present location. For example, if y were 10, the pointer would point the 20th location 108 in the array 100. This entry 108 would contain the minimum x value 106 for y10, and the next entry 109 would contain the maximum value 107 of x for y10.

Line 6060 of the genline algorithm 60 covers the special case where the line of the polygon 120 is horizontal. If the first y is equal to the second y, then there is a horizontal line. If on the horizontal line x2 is greater than x1, all the points are on the same scan line, and the implementation of the Bresenham algorithm is not needed. In this case the greatest value of x, x2, is stored as x max. If x2 is less than x1, the line lies in either octant III, IV, V, VI and the smallest value of x, x1, is stored as x min 106.

Lines 6070 to 6121 determine which octant the line 121–124 lies in. The logic branches out depending on whether x1 or x2 is greater, whether y1 or y2 is greater, and the relative signs of the slopes. Depending on these three variables, there are eight different cases. The octant that the line will be drawn in is then set up, along with the Bresenham constants "a" and "b".

Figure 15:
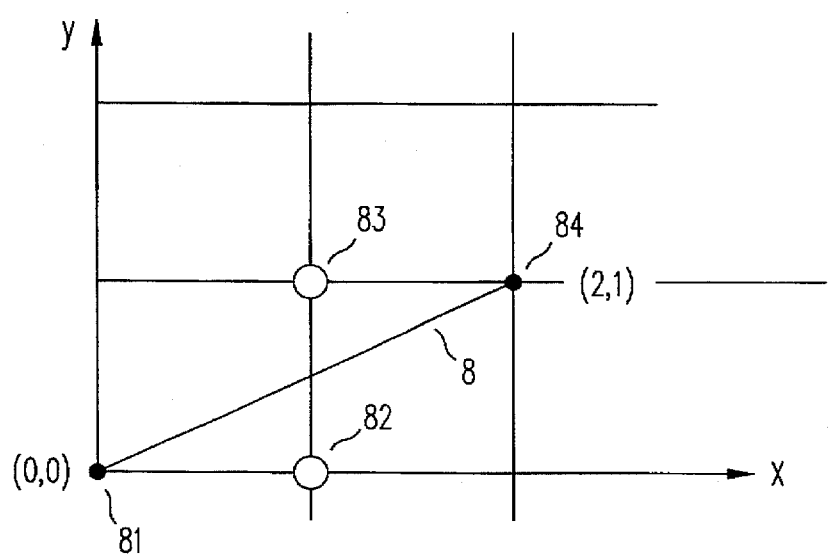
FIG. 15 illustrates the rounding error when the direction of traverse is reversed.

Lines 6124, 6125, 6126 take the results of the "a" and "b" constants and generate three more Bresenham constants called b minus a (bma) 170. The bma constant 170 is equal to two times b minus a. The b2 constant 171 is equal to two times b. The i constant 172 is the error constant which is equal to 2 times b minus a minus x2 less than x1. The term x2 less than x1 forces the rounding to be correct so that the same points are selected regardless of the direction the polygon is traversed. An example of this is shown in FIG. 15.

Typically, if a Bresenham line is drawn by traversing points in one direction, the same Bresenham line will not result if the points are traversed in the opposite direction. A simple way to show this is a line 8 that has a slope equal to one half as shown in FIG. 15. If the line starts at (0,0), pel 81 and ends at (2,1), pel 84, the ideal line 80 lies directly between pels 82 and 83. The Bresenham algorithm is defined such that there is a rounding up. Therefore, pel 83 would be turned on instead of pel 82 if the line were in the first octant. The Bresenham line would therefore consist of pels 81, 83, 84. If this same line were drawn as if it resided in octant five, the starting point would be at 2,1 and the line would be traversed to 0,0. Going in the opposite direction, the rounding up would cause pel 82 to be selected. In order to insure that the same line drawn in either direction comprises the same points, the rounding is always forced the same regardless of direction.

The rest of the genline algorithm 60, starting with line 6128, covers eight different cases depending upon which octant the line 121–124 lies in. For example, for octant one, the line is going up as was previously defined for octants I, II, VII, VIII. Therefore, the algorithm 60 is looking to store the maximum value of x for each y. The first point 141, (FIG. 12) is excluded in the loop. The loop begins with x equal to x1 plus 1. This loop is performed for x less than or equal to x2. If the error coefficient is less than zero, this means that the value wasn't great enough to move to the next scan line. The constant b2 is added to i and the loop is done again. If i is equal or greater than zero, this means that the half way point is exceeded and the next scan line is accessed. In that case, the previous value (x minus 1) 42, 44, 46, etc. on the previous scan line is saved in the table as x max 107 for the previous value of y. Therefore, the code between 6129 and 6139 has stored the last maximum value 42, 44, 46 of each scan line 132. There are also some special cases when the end of a scan line 132 is reached and no values have been stored yet. In this case, the last x value (as represented by x minus one since the for loop has already incremented x) for that scan line is stored.

All of the other cases also store the last pel from the previous scan line. For each line 121–124 of the polygon 120, the genline algorithm 60 is called. The part of the algorithm 60 that is implemented is dependent upon which octant the line resides.

The algorithm 60 only stores one pel location 130 for each scan line 132 for each line 121–24 of the polygon 120. This minimizes the number of store operations that have to be performed. Since the polygon is strictly convex, there will be exactly one minimum 106 and maximum 107 value stored for each scan line 132.

The general program ffpf1 40 (FIG. 4A, 4B, 4C, 4D) is the main driver program. In case five of this program, line 4136, there is a call to the first polygon fill routine, gsff 50 (FIG. 5A, 5B). The program gsff 50 (FIG. 5A, 5B) then calls genline 60 (FIG. 6A, 6B, 6C, 6D). Under case 6 of the program ffpf1 40, there is a call to the second polygon fill algorithm, gsff2 70 (FIG. 7A, 7B). If the conditions of the second polygon fill algorithm, gsff2 70, are met, gsff2 70 calls a second genline program, genline2 80 (FIG. 8A, 8B, 8C, 8d) at line 7099 of gsff2 70 FIG. 7B.

The second polygon fill routine, gsff2 70, also checks to see if the particular polygon is within the range of polygons applicable for the second polygon fill algorithm. This test is simpler than the test for the first polygon fill algorithm 60 since the test for the second polygon fill algorithm 80 only contains the once around in the y direction test, lines 7056–7070, FIG. 7A. As long as the y values 102 of a particular polygon only increase, and then decrease, the polygon can be filled by this second polygon fill algorithm 80.

Starting anywhere on the closed polygon, the algebraic sign of y2–y1 is check to see whether it changes either 2 or 3 times. This gives the condition of "y-convexity". That is, for any value of y 102, there is one and only one continuous fill line 133, FIG. 13A, 13B, 13C. Horizontal lines are considered to have the same sign as the previous line. Also, the maximum and minimum y values are recorded at the same time, lines 7060–7063, FIG. 7A. If the polygon fails the test, lines 7069–7070, FIG. 7A, the standard GSL polygon fill algorithm is used instead of the second polygon fill routine, genline2, 80 (FIG. 8A, 8B).

Figure 16A:
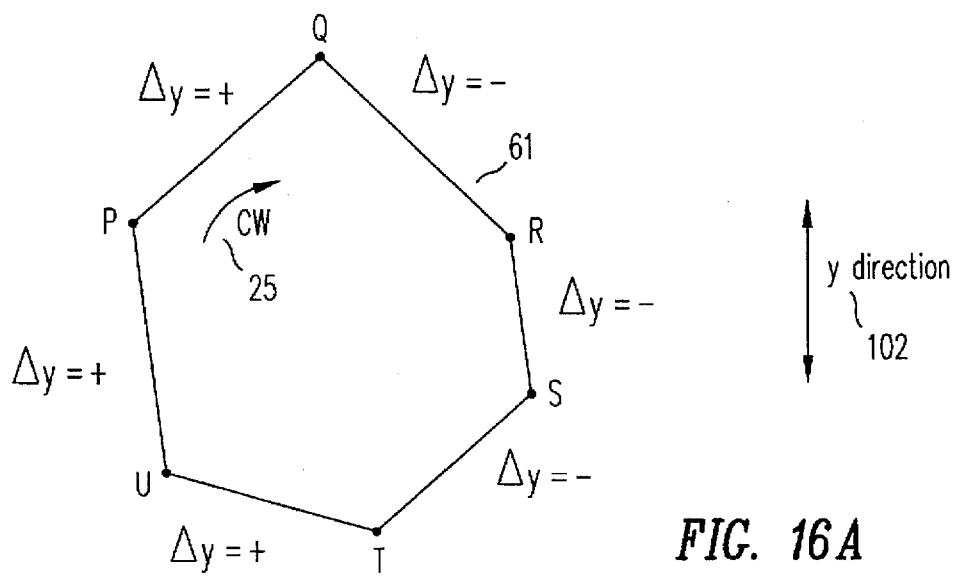
FIG. 16A illustrates a class of polygons that meet the once around test, and can be filled by the second polygon fill algorithm.

Referring to FIG. 16A for this once around test, and starting with vertex P and proceeding in the clockwise direction 25, the change in the delta y sign is recorded. Proceeding from vertex P to vertex Q, delta y is positive. Proceeding from vertex Q to vertex R, delta y is negative. Proceeding from vertex R to vertex S, delta y is negative. Proceeding from vertex S to vertex T, delta y is negative. Proceeding from vertex T to vertex U, delta y is positive. Proceeding from vertex U to vertex P, delta y is positive. Analyzing the changes in the change, delta y changed signs three times. If a polygon meets the once around test, the number of different sign changes will be exactly either two or three times. Taking this same polygon 61 as in FIG. 16A, if the polygon 61 were traversed beginning at vertex T in a clockwise direction 25, the count of the sign changes would be two. From vertex T to vertex Q, all delta y's are positive, and from vertex Q to vertex T in the clockwise direction 25, all delta y's are negative.

Figure 16B:
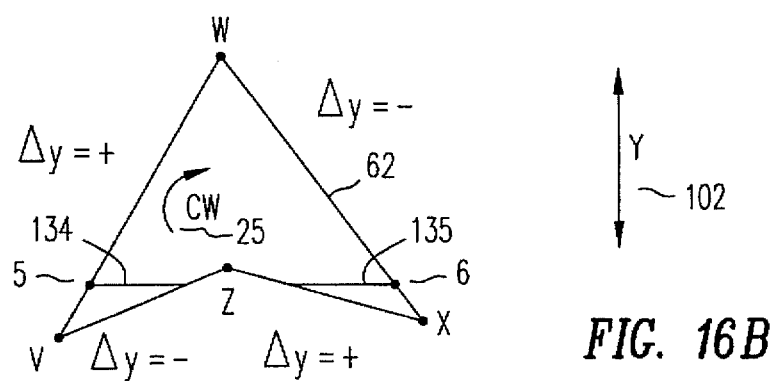
FIG. 16B illustrates a class of polygons that fail the once around test, and cannot be filled by the second polygon fill algorithm.

If the count of each group of delta y change in sign is greater than three, then the polygon fails the once around test as shown in FIG. 16B. The polygon 62 shown in FIG. 16B shows four different changes in signs of delta y as the polygon 62 is traversed clockwise starting with vertex V. The polygon 62 shown in FIG. 16B illustrates a polygon that could not be filled with this second polygon fill algorithm 80. This polygon 62 could not be filled with just one scan line 134, 135 as illustrated between point 5 and point 6. Although both point 5 and point 6 have the same y value 102, two different lines 134, 135 are needed to fill the polygon 62.

The second polygon fill algorithm 80 could be modified to fill polygons having the characteristics of the polygon 62 in FIG. 16B, but the algorithm would become more complex. For example, the algorithm could be expanded by having two sets of minimum and maximums, and initializing these values. However, the algorithm becomes more complex and the generality of the algorithm is lost.

Figure 16C:
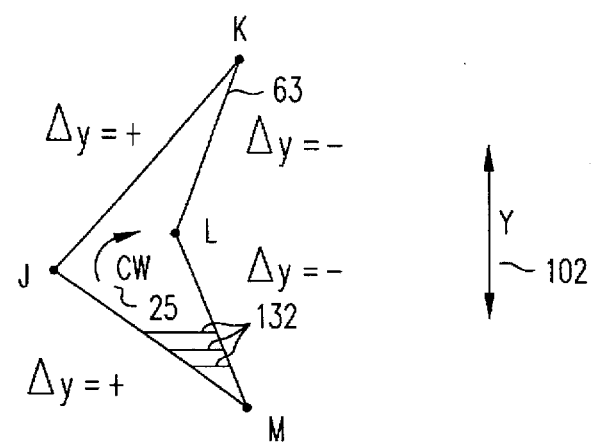
FIG. 16C illustrates a class of polygons that are not strictly convex, are concave in the x direction, and meet the once around test, and can be filled by the second polygon fill algorithm.

The polygon 63 shown in FIG. 16C is not strictly convex, but this polygon 63 still fits in with the second polygon fill algorithm 80. This polygon 63 is concave in the x direction. However, this polygon 63 meets this once around test. By traversing the polygon 63 clockwise 25 starting with vertex J, the delta y is positive from vertex J to vertex K. The delta y sign is negative from vertex K to vertex L and vertex L to vertex M. The delta y sign is then positive from vertex M to vertex J. No matter what the starting position, there will either be two or three changes in the sign of delta y. This polygon can be filled by a unique y scan line 132 for each y value 102.

If the polygon fails the once around test, the standard GSL polygon fill algorithm is used instead of the second polygon fill algorithm 80. If the once around condition is met, gsff2 70 FIG. 7B calls the second polygon fill algorithm, genline2, 80 FIG. 8A, 8B, 8C, 8D, at line 7099 FIG. 7B.

Genline2 80 is similar to genline1 60. However, instead of storing the last point on the scan line 132, it stores the first and last points on a scan line 132. In lines 8062, 8063 genline2 80 computes the slope as in genline1 60. Between lines 8072 and line 8121 there is the same octant logic as in genline1 60. Lines 8126-8128 have the same initialization of the Bresenham algorithm. From line 8139 there is the same for loop from x equal x plus one to x less than or equal to x2. The only difference is that now both minimum and maximum values are selected. If i is less than zero in line 8140, this means that nothing is changing. When i equal i plus b minus a, at table plus one, the previous maximum value of x is stored. Immediately, the table is moved up one and the present value of x which is on the new scan line is also stored. For any scan line, the fill line is drawn from the least minimum value to the greatest maximum value of the values which are stored in the two arrays.

Referring to FIG. 12, the second polygon fill algorithm, genline2, 80 begins at the point where y has the minimum value 1. For each line 121-124, the minimum and maximum value on each scan line 132 is saved in two tables 111, 112 FIG. 11. Each table 111, 112 has two entries 116, 118 for each y value 103. For lines 121, 122 between ymin 1 and ymax 2, in a counter clockwise direction 26, entries are made in a second table 112. For lines 123, 124 between ymax 2 and ymin 1, in a counter clockwise direction 26, entries are made in a first table 111.

Traversing up the polygon 120, table B 112 is used, and traversing down the polygon 120, table A 111 is used. There are more stores and processing in this routine 80 than the first polygon fill algorithm 60. This makes the second polygon fill routine 80 slower than the first polygon fill routine 60. However, the advantage is that it can fill a larger class of polygons FIG. 1A, 1B, 3A, 3B, 13A, 13B, 13C, 16A, 16C. Nevertheless, the second polygon fill routine 80 is still faster i.e. it takes less processing time, than the general polygon fill algorithm.

After filling the tables 111, 112 a multiline draw routine is called, lines 7111-7112 FIG. 7B to draw one horizontal line 142 per y 102 in the range ymin 1 to y max 2. This routine 70 combines the two tables 111, 112 into one table, line 7014 FIG. 7B, before calling the GSL multiline routine. The combining consists of finding the minimum of two minimums and the maximum of two maximums for each scan line 132. Alternatively, a multiline routine could be written that takes a pointer to both tables 111, 112 and creates the min and max for each scan line as it proceeds.

Traversing up the polygon 120, both values of the first pel 41, 43, 45 and last pels 42, 44, 46 on each scan line 132 respectively are stored. When this is completed the B array 112 is filled with both minimum and maximum values of x for each scan line 132. Traversing down the polygon 120, the minimum and maximum values of x for each scan line 132 are stored in the A array 111. Because of the convexity requirement, there is exactly one line on the way up, and one line on the way down. As a final post process, either pointers to both arrays are sent off to the display, or a post processor determines the least minimum value and the greatest maximum value for each scan line which is then sent off to the display.

While the invention has been particularly shown and described with reference to a preferred embodiment, it will be understood by those skilled in the art that various changes in form and detail may be made without departing from the spirit and scope of the invention. For example, although the invention has been described with reference to an x and y direction, it is within the spirit and scope of this invention that the directions could be interchanged. As such, this invention would accommodate any display that operated by having scan lines in the y direction instead of the x direction.

We claim:

1. An article of manufacture comprising:

a computer usable medium having computer readable program code means embodied therein for causing a polygon having a boundary definable by a plurality of selectable pels on a graphics display to be filled, the computer readable program code means in said article of manufacture comprising:

computer readable program code means for causing a computer to effect, with respect to one boundary line at a time, a sequential traverse of said plurality of selectable pels of each respective said boundary line;

computer readable program code means for causing the computer to store in an array during said traverse a value of an outer pel of said boundary of said plurality of selectable pels for each one of a plurality of scan lines of said polygon; and computer readable program code means for causing the computer to draw a fill line, after said traverse, between said outer pels having said stored values, for each said one of said scan lines.

2. A computer program product for use with a graphics display device, said computer program product comprising:

a computer usable medium having computer readable program code means embodied in said medium for causing a polygon having a boundary definable by a plurality of selectable pels in said graphics display device to be filled, said computer program product having:

computer readable program code means for causing a computer to effect, with respect to one boundary line at a time, a sequential traverse of said plurality of selectable pels of each respective said boundary line;

computer readable program code means for causing said computer to store in an array a maximum value of said selectable pels for each one of a plurality of scan lines of said polygon during said sequential traverse from a y minimum value of said polygon to a y maximum value of said polygon;

computer readable program code means for causing said computer to store in an array a minimum value of said selectable pels for each one of a plurality of scan lines of said polygon during said sequential traverse from a y maximum value of said polygon to a y minimum value of said polygon; and computer readable program code means for causing said computer to draw a fill line, after said sequential traverse, from said selectable pel of minimum value to said selectable pel of maximum value for each one of said plurality of scan lines.

3. A computer program product for use with a graphics display device, said computer program product comprising:

a computer usable medium having computer readable program code means embodied in said medium for causing a polygon having a plurality of lines definable by a plurality of selectable pels in said graphics display device to be filled, said computer program product having:

computer readable first program code means for determining if a sign of a vector product is the same for each one of two adjacent lines of the polygon;

computer readable second program code means for determining if the algebraic sign of the difference in the y value for each of two adjacent vertices of the polygon changes less than 4 times;

computer readable program code means for causing a computer to store in memory a y minimum value and a y maximum value of the polygon during said determination made by said second program code means;

computer readable program code means for causing the computer to store in memory a maximum value of said selectable pels for each one of a plurality of scan lines of said polygon during a traverse from the y minimum value of said polygon to the y maximum value of said polygon if said first and second program code means for determining are true;

computer readable program code means for causing the computer to store in memory a minimum value of said selectable pels for each one of a plurality of scan lines of said polygon during the traverse from the y maximum value of said polygon to the y minimum value of said polygon if said first and second program code means for determining are true; and computer readable program code means for causing the computer to draw a fill line, after said traverse, from said selectable pel of minimum value to said selectable pel of maximum value for each one of said plurality of scan lines if said first and second program code means for determining are true.

4. A computer program product comprising:

a computer usable medium having computer readable program code means embodied in said medium for causing a display in a graphic display device of a filled polygon having a boundary of lines definable by a plurality of selectable pels, said computer program product having:

computer readable program code means for causing a computer to effect a test of the polygon for one continuous scan line for each one of a plurality of scan lines within said polygon;

computer readable program code means for causing the computer to effect, with respect to one boundary line at a time, a sequential traverse of said plurality of selectable pels of each respective said boundary line;

computer readable program code means for causing the computer to store during said traverse a minimum and a maximum value of said selectable pels for each one of said plurality of scan lines for each one of said plurality of lines if the test of the polygon for one continuous scan line for each one of said plurality of scan lines is positive; and computer readable program code means for causing the computer to draw a fill line, after said traverse, from a least value of said minimum value to a greatest value of said maximum value for each one of said plurality of scan lines.

5. A computer program product comprising:

a computer usable medium having computer readable program code means embodied in said medium for causing a display in a graphic display device of a filled polygon having a boundary of lines definable by a plurality of selectable pels, said computer program product including:

computer readable program code means for determining if the algebraic sign of the difference in the y value for each of two adjacent vertices of the polygon changes less than 4 times;

computer readable program code means for causing a computer to effect, with respect to one boundary line at a time, a sequential traverse of said plurality of selectable pels of each said respective boundary line;

computer readable program code means for causing the computer to store during said traverse a minimum and a maximum value of said selectable pels for each one of said plurality of scan lines for each one of said plurality of lines if the program code means for determining is true; and computer readable program code means for causing the computer to draw a fill line, after said traverse, from a least value of said minimum value to a greatest value of said maximum value for each one of said plurality of scan lines.

6. A computer program product for use with a graphics display device, said computer program product comprising:

a computer usable medium having computer readable program code means embodied in said medium for causing a polygon having a boundary of lines definable by a plurality of selectable pels in said graphics display device to be filled, said computer program product including:

computer readable first program code means for determining if a sign of a vector product is the same for each one of two adjacent lines of the polygon;

computer readable second program code means for determining if the algebraic sign of the difference in the y value for each of two adjacent vertices of the polygon changes less than 4 times;

computer readable program code means for causing a computer to store in memory a y minimum value and a y maximum value of the polygon during said determination made by said second program code means;

computer readable program code means for causing the computer to effect, with respect to one boundary line at a time, a sequential traverse of said plurality of selectable pels of each respective said boundary line;

computer readable program code means for causing the computer to store in memory a maximum value of said selectable pels for each one of a plurality of scan lines of said polygon during a sequential traverse from the y minimum value of said polygon to the y maximum value of said polygon if said first and second program code means for determining are true;

computer readable program code means for causing the computer to store in memory a minimum value of said selectable pels for each one of a plurality of scan lines of said polygon during the sequential traverse from the y maximum value of said polygon to the y minimum value of said polygon if said first and second program code means for determining are true;

computer readable program code means for causing the computer to draw a fill line, after said traverse, from said selectable pel of minimum value to said selectable pel of maximum value for each one of said plurality of scan lines if said first and second program code means for determining are true;

computer readable program code means for causing the computer to store a minimum and a maximum value of said selectable pels for each one of said plurality of scan lines for each one of said plurality of lines during said traverse if the first program code means for determining is false and the second program code means for determining is true; and computer readable program code means for causing the computer to draw a fill line, after said traverse, from a least value of said minimum value to a greatest value of said maximum value for each one of said plurality of scan lines if said first program code means for determining is false and the second program code means for determining is true.

7. An article of manufacture for use in a computer system having an operating system and a graphics support library for filling a polygon having a boundary defined by a plurality of selectable pels displayed on a graphics display, said article of manufacture comprising a computer usable medium having computer readable program code means embodied in said medium, said program code means including:

computer readable program code means embodied in said computer usable medium for causing a computer to effect, with respect to one boundary line at a time, a sequential traverse of said plurality of selectable pels of each respective said boundary line;

computer readable program code means embodied in said computer usable medium for causing a computer to generate an array, during said traverse, having a plurality of maximum values and a plurality of minimum values, each one of said maximum values representative of each one of an outer point of said boundary for each one of a plurality of scan lines during said traverse from a y minimum value of said polygon to a y maximum value of said polygon and each one of said minimum values representative of each one of said outer point of said boundary for each one of a plurality of scan lines during said traverse from the y maximum value of the polygon to the y minimum value of said polygon; and computer readable program code means embodied in said computer usable medium for passing a pointer to the array, after said sequential traverse of said polygon, to a routine in the graphics support library of the computer for drawing a fill line from said outer point of said minimum value to said outer point of said maximum value for each one of said plurality of scan lines.

8. An article of manufacture for use in a computer system having an operating system and a graphics support library for filling a polygon having a boundary definable by a plurality of lines of a plurality of selectable pels displayed on a graphics display, said article of manufacture comprising a computer usable medium having computer readable program code means embodied in said medium including:

computer readable program code means embodied in said computer usable medium for causing the computer to effect a test of the polygon to determine if there is one continuous scan line for each one of a plurality of scan lines of said polygon;

computer readable program code means embodied in said computer usable medium for causing the computer to effect, with respect to one boundary line at a time, a sequential traverse of said plurality of selectable pels of each respective said boundary line;

computer readable program code means embodied in said computer usable medium for causing the computer to generate an array having a minimum value and a maximum value each representing a point along the boundary of the polygon, during said traverse, for each one of said plurality of scan lines for each one of a plurality of lines of the polygon if the test to determine if there is one continuous scan line for each one of said plurality of scan lines is positive; and computer readable program code means embodied in said computer usable medium for passing a pointer to the array, after said sequential traverse of said polygon, to a routine in the graphics support library of the computer for drawing a fill line between a least value of said minimum value and a greatest value of said maximum value for each one of said plurality of scan lines.

9. An article of manufacture for use in a computer system having an operating system and a graphics support library for filling a polygon having a boundary definable by a plurality of lines of a plurality of selectable pels displayed on a graphics display, said article of manufacture comprising a computer usable medium having computer readable program code means embodied in said medium, including:

computer readable program code first means embodied in said computer usable medium for causing the computer to effect a determination if a sign of a vector product is the same for each one of two adjacent lines of the polygon;

computer readable program code second means embodied in said computer usable medium for causing the computer to effect a determination if the algebraic sign of the difference in a y value for each of two adjacent vertices of the polygon changes less than 4 times;

computer readable program code means embodied in said computer usable medium for causing the computer to store in memory, during said determination caused by said second means, a y minimum value and a y maximum value of the polygon;

computer readable program code means embodied in said computer usable medium for causing the computer to effect, with respect to one boundary line at a time, a sequential traverse of said plurality of selectable pels of each respective said boundary line;

computer readable program code means embodied in said computer usable medium for causing a computer to generate an array, during said traverse, having a maximum value representing an outer point of said boundary of said polygon for each one of a plurality of scan lines of said polygon during said sequential traverse from the y minimum value of said polygon to said y maximum value of said polygon, and having a minimum value representing an outer point of said boundary of said polygon for each one of a plurality of scan lines of said polygon during said sequential traverse from the y maximum value to the y minimum value of said polygon if said first and second means for determining are true;

computer readable program code means embodied in said computer usable medium for passing a pointer to the array, after said sequential traverse of said polygon, to a routine in the graphics support library of the computer for drawing a fill line between said outer points represented as said maximum value and said minimum value in said array for each one of said plurality of scan lines if said first and second means for determining are true;

computer readable program code means embodied in said computer usable medium for causing a computer to generate an array having a minimum value and a maximum value each representing a point along the boundary of the polygon, during said traverse, for each one of said plurality of scan lines for each one of a plurality of lines of the polygon if the first means for determining is false and the second means for determining is true; and computer readable program code means embodied in said computer usable medium for passing a pointer to the array, after said sequential traverse of said polygon, to a routine in the graphics support library of the computer for drawing a fill line between a least value of said minimum value and a greatest value of said maximum value for each one of said plurality of scan lines if the first means for determining is false and the second means for determining is true.

10. A program storage device readable by a machine, tangibly embodying a program of instructions executable by the machine to perform method steps for filling a polygon having a boundary definable by a plurality of lines displayed on a graphics display of said machine, said method steps comprising:

testing the polygon to determine if there is one continuous scan line for each one of a plurality of scan lines of said polygon;

sequentially traversing first the boundary of the polygon from a lowest point of the polygon to a highest point of the polygon and sequentially traversing second the boundary of the polygon from the highest point of the polygon to the lowest point of the polygon;

generating a first array, during said first sequential traverse, having a minimum value and a maximum value representing a minimum point and a maximum point along the boundary of the polygon for each one of said plurality of scan lines for each one of a plurality of lines of the polygon if the test to determine if there is one continuous scan line for each one of said plurality of scan lines is positive;

generating a second array, during said second sequential traverse, having a minimum value and a maximum value representing a minimum point and a maximum point along the boundary of the polygon for each one of said plurality of scan lines for each one of a plurality of lines of the polygon if the test to determine if there is one continuous scan line for each one of said plurality of scan lines is positive;

combining said first array and said second array into one array having a greatest maximum value and a least minimum value for each one of said plurality of scan lines; and passing a pointer to said one array, after said sequential traverse of said polygon, to a routine in a graphics support library in the machine for drawing a fill line between said least minimum value and said greatest maximum value for each one of said plurality of scan lines.

* * * * *